(12) United States Patent
Rushton et al.

(10) Patent No.: US 11,846,089 B2
(45) Date of Patent: Dec. 19, 2023

(54) HYDRAULIC SYSTEM

(71) Applicant: J. C. Bamford Excavators Limited, Uttoxeter (GB)

(72) Inventors: Tom Rushton, Uttoxeter (GB); Richard Martinson, Uttoxeter (GB)

(73) Assignee: J. C. Bamford Excavators Limited, Uttoxeter (GB)

( * ) Notice: Subject to any disclaimer, the term of this patent is extended or adjusted under 35 U.S.C. 154(b) by 259 days.

(21) Appl. No.: 17/105,423

(22) Filed: Nov. 25, 2020

(65) Prior Publication Data

US 2021/0156403 A1    May 27, 2021

(30) Foreign Application Priority Data

Nov. 26, 2019    (GB) ...................................... 1917216

(51) Int. Cl.
*B60T 13/22*    (2006.01)
*B60T 13/14*    (2006.01)
(Continued)

(52) U.S. Cl.
CPC ............. *E02F 9/2285* (2013.01); *B60T 13/22* (2013.01); *B62D 5/064* (2013.01); *E02F 9/225* (2013.01);
(Continued)

(58) Field of Classification Search
CPC .......... B60T 13/18; B60T 13/20; B60T 13/22; B60T 13/14; B60T 13/686;
(Continued)

(56) References Cited

U.S. PATENT DOCUMENTS 4,070,857 A * 1/1978 Wible .................... F15B 13/022
60/431
4,144,946 A * 3/1979 Melocik .................... B66F 9/22
60/911

(Continued)

FOREIGN PATENT DOCUMENTS

EP    1 182 357 A1    2/2002
EP       1759950 A1 *    3/2007 .............. B60T 13/22
(Continued)

OTHER PUBLICATIONS

EP 1759950 A1 translation. (Year: 2007).*
(Continued)

*Primary Examiner* — Thomas J Williams
(74) *Attorney, Agent, or Firm* — MARSHALL, GERSTEIN & BORUN LLP

(57) ABSTRACT

A hydraulic system for an electric working vehicle or hybrid working vehicle of the kind having an electric source of power and an alternative source of power, the hydraulic system comprising: one or more hydraulically actuated devices; and a hydraulic pump configured to supply hydraulic fluid to the one or more hydraulically actuated devices; wherein the hydraulic pump is configured to operate in a low output state when a flow of hydraulic fluid is not required by the one or more hydraulically actuated devices; and wherein the hydraulic system is configured to use hydraulic fluid supplied by the hydraulic pump in the low output state for one or more auxiliary functions of the hydraulic system.

16 Claims, 8 Drawing Sheets

(51) Int. Cl.
*B60T 13/68* (2006.01)
*E02F 9/22* (2006.01)
*B62D 5/06* (2006.01)
*B62D 5/07* (2006.01)

(52) U.S. Cl.
CPC ............ *B60T 13/14* (2013.01); *B60T 13/686* (2013.01); *B60T 2270/60* (2013.01); *B62D 5/07* (2013.01)

(58) Field of Classification Search
CPC ....... B60T 2270/60; B62D 5/07; B62D 5/064; E02F 9/225; E02F 9/2285
See application file for complete search history.

(56) References Cited

U.S. PATENT DOCUMENTS

| | | | | |
|---|---|---|---|---|
| 4,573,319 A | * | 3/1986 | Chichester | B62D 5/07 60/423 |
| 4,856,622 A | | 8/1989 | Sartain et al. | |
| 5,542,490 A | * | 8/1996 | Kemshall | B62D 5/07 60/431 |
| 5,900,704 A | * | 5/1999 | Henninger | B62D 5/065 318/590 |
| 6,254,197 B1 | * | 7/2001 | Lading | F03D 7/0244 303/2 |
| 2018/0201246 A1 | | 7/2018 | Kashiwai et al. | |
| 2021/0156403 A1 | * | 5/2021 | Rushton | E02F 9/2221 |

FOREIGN PATENT DOCUMENTS

| | | |
|---|---|---|
| JP | H055658 U | 1/1993 |
| JP | 2016094095 A | 5/2016 |
| WO | WO-2009/149712 A1 | 12/2009 |

OTHER PUBLICATIONS

Extended European Search Report for EP 20209719.2, dated May 7, 2021.
Search Report issued in GB Patent Application No. 1917216.2, dated Aug. 19, 2020.

* cited by examiner

HYDRAULIC SYSTEM

FIELD

The present teachings relate to a hydraulic system for an electric working vehicle or hybrid working vehicle of the kind having an electric source of power and an alternative source of power. The teachings also relate to a method of operating a hydraulic system for an electric working vehicle or hybrid working vehicle of the kind having an electric source of power and an alternative source of power.

BACKGROUND

Working vehicles (e.g. excavators, backhoe loaders, telehandlers, skid steer loaders etc) typically include a number of hydraulically actuated devices such as working arms and power steering devices. Such hydraulically actuated devices operate by receiving a flow of hydraulic fluid from a hydraulic pump of the hydraulic system of the working vehicle.

In typical working vehicles powered by an internal combustion engine (ICE) as prime mover, the hydraulic pump is coupled to an output shaft of the ICE. The output shaft of an ICE rotates when the engine is running (even when the engine is idle). Therefore, the hydraulic pump is always pumping hydraulic fluid around the hydraulic system when the engine is running. If hydraulic fluid is not required by the hydraulically actuated devices, the hydraulic fluid supplied by the pump is diverted back to a sump or hydraulic reservoir.

Because the hydraulic pump of an ICE powered working vehicle is pumping whenever the engine is running, a flow of hydraulic fluid is instantaneously available when required by a hydraulically actuated device. This is particularly useful for hydraulic power steering devices, where any delay between moving the steering wheel and receiving hydraulic assistance would result in a temporary "heavy" feel of the steering.

In a working vehicle powered by a prime mover in the form of an electric motor, there is typically a direct drive to the wheels or tracks of the vehicle and the electric motor does not move when the working vehicle is idle (e.g. when the wheels and or tracks of the working vehicle are stationary). Therefore, a separate electric motor is required to power the hydraulic pump, so that hydraulic fluid can be provided to hydraulically actuated devices of the working vehicle (e.g. a working arm), even when the working vehicle is stationary.

The hydraulic pump can be driven continuously by the separate electric motor, so that hydraulic fluid is instantaneously available when required by the hydraulically actuated devices. However, this wastes energy. Alternatively, the electric motor can be actuated in response to the demand for hydraulic fluid in the hydraulic system. This saves energy, but results in a lag between an increase in demand and an increase in supply of hydraulic fluid to a hydraulically actuated device. In working vehicles with hydraulic power steering, this lag can result in a temporary "heavy" feel of the steering.

The present teachings seek to overcome or at least mitigate one or more problems associated with the prior art.

SUMMARY

According to a first aspect of the teachings, a hydraulic system for an electric working vehicle or hybrid working vehicle of the kind having an electric source of power and an alternative source of power is provided, the hydraulic system comprising:
one or more hydraulically actuated devices; and
a hydraulic pump configured to supply hydraulic fluid to the one or more hydraulically actuated devices;
wherein the hydraulic pump is configured to operate in a low output state when a flow of hydraulic fluid is not required by the one or more hydraulically actuated devices; and
wherein the hydraulic system is configured to use hydraulic fluid supplied by the hydraulic pump in the low output state for one or more auxiliary functions of the hydraulic system.

By operating the hydraulic pump in a low output state rather than an 'off' state, a low flow rate of hydraulic fluid is instantaneously available when required by a hydraulically actuated device. This also reduces the time delay to ramp up to a higher output hydraulic pump state when a high flow rate of hydraulic fluid is required by a hydraulically actuated device. These properties are useful for hydraulically actuated devices such as hydraulic power steering devices, since it is desirable for the user to feel the power steering assistance as soon as they turn the steering wheel, and to minimise the delay between turning the steering wheel and receiving the maximum power steering assistance.

By utilising hydraulic fluid supplied by the hydraulic pump in the low output state for one or more auxiliary functions of the hydraulic system, some of the energy that would otherwise be lost by operating the hydraulic pump in the low output state when a flow of hydraulic fluid is not required by the one or more hydraulically actuated devices can be recovered to be used elsewhere in the hydraulic system. This increases the efficiency of the hydraulic system.

In exemplary embodiments, the output of the hydraulic pump in the low output state is less than 50% of the maximum output of the hydraulic pump.

In exemplary embodiments, the output of the hydraulic pump in the low output state is less than 25% of the maximum output of the hydraulic pump.

In exemplary embodiments, the output of the hydraulic pump in the low output state is in a range of 5% to 20% of the maximum output of the hydraulic pump.

Having such a level of output in the low output state has been found to be a good tradeoff between conserving power and reducing the time delay to ramp up to a higher output state when required.

In exemplary embodiments, the hydraulic pump is configured to operate in a higher output state when a flow of hydraulic fluid is required by one or more of the hydraulically actuated devices, wherein the output of the hydraulic pump in the higher output state is the lesser of: the flow rate of hydraulic fluid required by the one or more hydraulically actuated devices; and the maximum output flow rate of the hydraulic pump.

In other words, when a flow of hydraulic fluid is required by one or more of the hydraulically actuated devices, the hydraulic pump will be configured to supply the required flow rate of hydraulic fluid unless the required flow rate of hydraulic fluid is greater than the maximum output flow rate of the hydraulic pump. In this case, the hydraulic pump would operate at its maximum output flow rate until the required flow rate of hydraulic fluid decreases below the maximum output flow rate of the pump.

In exemplary embodiments, one of the one or more hydraulically actuated devices is a hydraulic power steering device.

In exemplary embodiments, the output of the hydraulic pump in the low output state is less than a maximum demand of hydraulic fluid from the hydraulic power steering device.

In exemplary embodiments, the output of the hydraulic pump in the low output state is in a range of 30% to 70% of a maximum demand of hydraulic fluid from the hydraulic power steering device.

In exemplary embodiments, the output of the hydraulic pump in the low output state is substantially 50% of a maximum demand of hydraulic fluid from the hydraulic power steering device.

Having such a level of output in the low output state has been found to be a good tradeoff between conserving power and reducing the time delay to ramp up to a higher output state when required by the hydraulic power steering device or other hydraulically actuated devices. In addition, such a level of output in the low output state provides an instantaneous flow rate of hydraulic fluid to the hydraulic power steering device when a user steers the working vehicle, so that the user feels the power steering assistance as soon as they turn the steering wheel.

In exemplary embodiments, the hydraulic power steering device comprises a steering orbitrol connected to a double rod hydraulic cylinder connected to the left and right wheels of the working vehicle.

In exemplary embodiments, the hydraulic power steering device comprises a steering orbitrol connected to two hydraulic cylinders connected to left and right wheels of the working vehicle.

In exemplary embodiments, the steering orbitrol is also connected to a hydraulic fluid reservoir. In this way, when hydraulic fluid needs to be removed from one or more of the hydraulic steering cylinders, it can be directed via the orbitrol to the hydraulic reservoir.

In exemplary embodiments, the hydraulic system further comprises a hydraulic accumulator, wherein the hydraulic system is configured to supply hydraulic fluid from the hydraulic pump in the low output state to the hydraulic accumulator.

In this way, some of the energy required to operate the hydraulic pump in the low output state is stored to be used by functions of the hydraulic system when required. This increases the efficiency of the hydraulic system.

In exemplary embodiments, the hydraulic system further comprises a spring applied hydraulically released (SAHR) brake, wherein pressure in the hydraulic accumulator is used to release the SAHR brake.

In this way, the energy stored in the hydraulic accumulator when the hydraulic pump is operating in the low output state can be used to power the auxiliary function of releasing the SAHR brake. This results in a more efficient hydraulic system than one where a flow of hydraulic fluid must be constantly supplied to release a SAHR brake. For example, theoretical results have shown such a configuration may provide up to 51% energy saving in the SAHR brake system.

In exemplary embodiments, the hydraulic system further comprises a SAHR brake valve positioned between the hydraulic accumulator and the SAHR brake, wherein the SAHR brake valve is configured to control the state of the SAHR brake via selectively permitting or blocking a flow of hydraulic fluid from the hydraulic accumulator to the SAHR brake.

In exemplary embodiments, the SAHR brake valve comprises a first port connected to the SAHR brake, a second port connected to the hydraulic accumulator and a third port connected to a hydraulic fluid reservoir, wherein the SAHR brake valve is configured to control the state of the SAHR brake via selectively connecting the first port to the second or third ports.

In this way, the SAHR brake valve is configured to release the SAHR brake via permitting flow of hydraulic fluid between the hydraulic accumulator (port 2) and the SAHR brake (port 1), and blocking flow of hydraulic fluid between the SAHR brake (port 1) and the hydraulic fluid reservoir (port 3).

Similarly, the SAHR brake valve is configured to apply the SAHR brake via permitting flow of hydraulic fluid between the SAHR brake (port 1) and the hydraulic reservoir (port 3), and blocking flow of hydraulic fluid between the hydraulic accumulator (port 2) and the SAHR brake (port 1).

In exemplary embodiments, the hydraulic system further comprises a SAHR brake valve solenoid configured to control the state of the SAHR brake valve.

This provides a more flexible variety of control options than a pilot operated valve.

In exemplary embodiments, the SAHR brake valve can be actuated via a hand brake, lever, switch or other user input of the working vehicle.

In this way, the user has control over the state of the SAHR brake.

In exemplary embodiments, the SAHR brake valve can be actuated automatically via a control system.

In this way, the control system may apply the SAHR brake independently of the user inputs. This may improve safety and improve efficiency. For example, the control system may apply the SAHR brake when it detects the working vehicle is on a hill and is not moving. This prevents unintentional rolling of the vehicle (improved safety) and removes the need to use the propulsion system to hold the vehicle stationary (improves efficiency).

In exemplary embodiments, the SAHR brake valve is a proportional valve. This allows the SAHR brake to be applied proportionally, rather than just being fully "on" or fully "off".

In exemplary embodiments, the control system is configured to actuate the SAHR brake valve so that the SAHR brake supplements or replaces a regenerative braking function of the working vehicle, at least temporarily.

Supplementing or replacing a regenerative braking function of the working vehicle via actuation of the SAHR brake is useful for times when regenerative braking is not available. For example, when a battery of the working vehicle has recently been charged and the working vehicle travels down a long incline, regenerative braking may lead to overcharge/damage of the battery. In this instance, regenerative braking would be turned off to avoid damage, which could lead to unwanted acceleration of the working vehicle and/or excessive loading on manual brakes of the working vehicle. Turning off the regenerative braking may also result in the manual brakes being less responsive and feeling 'heavier'. Supplementing the regenerative braking with proportional actuation of the SAHR brake therefore improves the safety and braking 'feel' of the working vehicle.

In exemplary embodiments, the SAHR brake valve can be actuated via a manual override input of the working vehicle, wherein the manual override input is configured to control the state of the SAHR brake valve in the event of a power failure.

In this way, in the event of a power failure, the manual override input can be used to release the SAHR brake, so that the working vehicle can be towed easily. This also allows the SAHR brake cable to be relieved of tension before any maintenance, if required.

In exemplary embodiments, the hydraulic system further comprises a first set of valves comprising one or more directional control valves, wherein the first set of valves is configured to direct hydraulic fluid to the one or more hydraulically actuated devices and/or auxiliary functions of the hydraulic system.

In this way, hydraulic fluid can be directed around the hydraulic system as required.

In exemplary embodiments, the first set of valves is provided in a single valve block.

A single valve block may be more compact and simpler to connect to a hydraulic system than a plurality of valve blocks connected together.

In exemplary embodiments, the first set of valves is solenoid actuated.

In this way, the one or more directional control valves can be controlled via an electronic/digital control system. This provides a flexible variety of control options.

In exemplary embodiments, the hydraulic system is configured to control the state of the first set of valves to prioritise flow to the hydraulic power steering device.

In other words, when the hydraulic fluid demand of the power steering device and the other hydraulically actuated devices and/or auxiliary functions is greater than the supply of hydraulic fluid from the hydraulic pump, the first set of valves will direct the required amount of hydraulic fluid to the power steering device, and any surplus flow will be directed to the other devices/functions. If the supply of hydraulic fluid from the hydraulic pump is less than the hydraulic fluid demand of the power steering device, all of the flow of hydraulic fluid will be directed to the power steering device.

In cases where there is sufficient flow of hydraulic fluid from the hydraulic pump to meet the hydraulic fluid demands of the power steering and other functions of the hydraulic system, the first set of valves will direct hydraulic fluid to each hydraulically actuated device/function as required.

Power steering may be the most safety-critical function of a hydraulic system for a working vehicle. Therefore, prioritising flow to the hydraulic power steering device over other components reduces the chances of a vehicle accident due to steering issues.

In exemplary embodiments, the hydraulic system further comprises:

a second set of valves comprising one or more directional control valves, wherein the second set of valves is configured to direct hydraulic fluid towards one or more of the hydraulically actuated devices; and a pilot line located between the hydraulic accumulator and the second set of valves, wherein the hydraulic system is configured to selectively alter the pressure in the pilot line in order to permit or inhibit movement of the second set of valves.

In this way, the energy stored in the hydraulic accumulator when the hydraulic pump is operating in the low output state can be used to power the auxiliary function of permitting or inhibiting movement of the second set of valves. This results in a more efficient hydraulic system than one where a pilot line is connected directly to the hydraulic pump.

In exemplary embodiments, the second set of valves is provided in a single valve block.

A single valve block may be more compact and simpler to connect to a hydraulic system than a plurality of valve blocks connected together.

In exemplary embodiments, the hydraulic system further comprises a pilot line isolation valve positioned between the hydraulic accumulator and the second set of valves, wherein the pilot line isolation valve is configured to permit or inhibit movement of the second set of valves via selectively permitting or blocking a flow of hydraulic fluid from the hydraulic accumulator to the second set of valves.

This provides a mechanism for isolating the second set of valves. Advantageously, this may improve safety. For example, in the event that a dangerous situation is detected, the second set of valves may be isolated to instantly prevent actuation of the one or more hydraulically actuated devices connected thereto.

In exemplary embodiments, the pilot line isolation valve comprises a first port connected to the second set of valves, a second port connected to the hydraulic accumulator and a third port connected to a hydraulic fluid reservoir, and wherein the pilot line isolation valve is configured to permit or inhibit movement of the second set of valves via selectively connecting the first port to the second or third ports.

In this way, the pilot line isolation valve is configured to pressurise the pilot line to permit movement of the second set of valves by permitting flow of hydraulic fluid between the hydraulic accumulator (port 2) and the second set of valves (port 1), and blocking flow of hydraulic fluid between the second set of valves (port 1) and the hydraulic fluid reservoir (port 3).

Similarly, the pilot line isolation valve is configured to de-pressurise the pilot line to inhibit movement of the second set of valves by permitting flow of hydraulic fluid between the second set of valves (port 1) and the hydraulic reservoir (port 3), and blocking flow of hydraulic fluid between the hydraulic accumulator (port 2) and the second set of valves (port 1).

In exemplary embodiments, the hydraulic system further comprises a pilot line isolation valve solenoid configured to control the state of the pilot line isolation valve.

This provides a flexible variety of control options.

In exemplary embodiments, the hydraulic system further comprises a service hose connection port coupled to the second set of valves.

Advantageously, this provides the option to provide hydraulic fluid to additional hydraulic services which are not always connected to the working vehicle. For example, it may be desirable to connect an attachment such as a grab or sweeper to the working vehicle, which utilises hydraulic fluid in its operation.

In exemplary embodiments, the hydraulic system further comprises a user input configured to stop the hydraulic pump.

When connecting hoses to or disconnecting hoses from the service hose connection port or between the one or more hydraulically actuated devices and the second set of valves, it is desirable to depressurise the hoses and hydraulic lines upstream of the second set of valves, to prevent leaking of hydraulic fluid. The hydraulic accumulator stores pressurised hydraulic fluid, which can be used to provide a flow of hydraulic fluid to pressurise the pilot line, even when the hydraulic pump has been stopped.

In this way, the pilot line can be pressurised to permit movement of the second set of valves. This allows the service hose connection port and/or service hose connected thereto, or one or more hydraulically actuated devices and hoses connected thereto, to be de-pressurised by connecting to a hydraulic reservoir via the second set of valves (e.g. via operating the pilot line isolation valve solenoid).

In exemplary embodiments, the hydraulic system further comprises one or more working arm actuators connected to the second set of valves, wherein the second set of valves is configured to direct hydraulic fluid to the one or more working arm actuators in order to control movement of a working arm of the working vehicle.

In this way, the hydraulic system is able to control a working arm of the working vehicle in order to perform a work operation such as lifting, tipping, digging etc.

In exemplary embodiments, the SAHR brake valve, the first set of valves and the pilot line isolation valve are provided in a single valve block.

A single valve block may be more compact and simpler to connect to a hydraulic system than a plurality of valve blocks connected together.

In exemplary embodiments, the hydraulic system further comprises a supplementary brake configured to supplement or replace a regenerative braking function of the working vehicle, at least temporarily, wherein pressure in the hydraulic accumulator is used to apply the supplementary brake.

Supplementing or replacing a regenerative braking function of the working vehicle via actuation of the supplementary brake is useful for times when regenerative braking is not available. For example, when a battery of the working vehicle has recently been charged and the working vehicle travels down a long incline, regenerative braking may lead to overcharge/damage of the battery. In this instance, regenerative braking would be turned off to avoid damage, which could lead to unwanted acceleration of the working vehicle and/or excessive loading on manual brakes of the working vehicle. Turning off the regenerative braking may also result in the manual brakes being less responsive and feeling 'heavier'. Supplementing the regenerative braking with proportional actuation of the supplementary brake therefore improves the safety and braking 'feel' of the working vehicle.

In exemplary embodiments, the hydraulic system further comprises a supplementary brake valve positioned between the hydraulic accumulator and the supplementary brake, wherein the supplementary brake valve is actuated via a control system and is configured to control the state of the supplementary brake via controlling a flow of hydraulic fluid from the hydraulic accumulator to the supplementary brake.

Actuation via a control system ensures that when regenerative braking is turned off (i.e. via the control system) the supplementary brake valve can be actuated to apply the supplementary brake, so that the working vehicle does not accelerate undesirably.

In exemplary embodiments, the hydraulic system further comprises a supplementary brake valve solenoid configured to control the state of the supplementary brake valve.

This provides a flexible variety of control options.

In exemplary embodiments, the control system is configured to actuate the supplementary brake valve so that the supplementary brake replaces a regenerative function of the working vehicle when a state of charge of a battery of the working vehicle is above a threshold value.

Replacing the regenerative braking function of the working vehicle when the state of charge of the battery is above a threshold value ensures that the battery does not overcharge (which can lead to degradation of the battery) whilst preventing the working vehicle from accelerating undesirably.

In exemplary embodiments, the threshold value is 98% of maximum capacity of the battery.

Such a threshold has been found to provide a good balance between maximising recharging performance and preserving battery capacity.

In exemplary embodiments, the control system is configured to actuate the supplementary brake valve so that the supplementary brake is actuated simultaneously with a regenerative braking function of the working vehicle; optionally, wherein the control system is configured to actuate the supplementary brake valve so that the supplementary brake is actuated simultaneously with a regenerative braking function of the working vehicle when the state of charge of the battery is within a range close to the threshold value (e.g. 90% to 98% of maximum capacity); optionally, wherein the control system is configured so that the proportion of braking forces provided by the supplementary brake ramps up from a minimum proportion at a lower end of the range (e.g. at 90% state of charge), to a maximum proportion at the threshold value (e.g. at 98% state of charge).

Such a configuration allows the regenerative braking function of a working vehicle to operate at less than maximum regenerative brake force (e.g. to avoid charging a battery too quickly), whilst simultaneously operating the supplementary brake so that the difference between the regenerative braking force applied and maximum regenerative braking force is made up via actuation of the supplementary brake. This prevents the working vehicle from accelerating undesirably.

In exemplary embodiments, the hydraulic system further comprises a service brake valve positioned between the hydraulic accumulator and the supplementary brake, wherein the service brake valve is actuated via a brake pedal of a working machine and is configured to control the state of the supplementary brake via controlling a flow of hydraulic fluid from the hydraulic accumulator to the supplementary brake.

Such an arrangement allows an operator of the working machine to selectively apply the supplementary brake (e.g. when it is desired to decelerate the working vehicle more quickly than can be done via regenerative braking alone). Furthermore, by controlling a flow of hydraulic fluid from the hydraulic accumulator to the supplementary brake (e.g. as opposed to mechanically actuating the supplementary brake) a greater braking force can be provided than would be provided by a foot of the operator.

In exemplary embodiments, the service brake valve comprises a spool which is mechanically connected to the brake pedal.

Having a mechanical connection ensures that the service brake valve can be actuated in the event of an electrical power failure.

In exemplary embodiments, the supplementary brake valve and the service brake valve are each connected to the supplementary brake via a shuttle valve, wherein the supplementary brake valve supplies a first flow of hydraulic fluid to the shuttle valve at a first pressure and the service brake valve supplies a second flow of hydraulic fluid to the shuttle valve at a second pressure, and wherein the shuttle valve is configured so that the supplementary brake receives the first flow of hydraulic fluid when the first pressure is greater than the second pressure, and so that the supplementary brake receives the second flow of hydraulic fluid when the second pressure is greater than the first pressure.

Having such a shuttle valve arrangement allows the maximum pressure to be applied to the supplementary brake so that the working vehicle never "under-brakes" (i.e. either a force replicating the usual regenerative braking force is provided to the supplementary brake via the supplementary brake valve, or if greater, a desired braking force provided by the operator via depression of the brake pedal is provided to the supplementary brake via the service brake valve).

In exemplary embodiments, the hydraulic system further comprises an electric motor configured to drive the hydraulic pump.

Advantageously, an electric motor can be sped up or slowed down, as required, in order to vary the output of the hydraulic pump to meet the hydraulic fluid demand of the hydraulic system. This contrasts with a hydraulic pump in a traditional diesel engine, whose output is determined by the engine drive shaft speed.

In exemplary embodiments, the electric motor is a dedicated hydraulic pump driving motor.

In other words, the electric motor does not drive other functions of the working vehicle, such as an electric propulsion system. In this way, the electric motor can be sped up or slowed down, as required, in order to vary the output of the hydraulic pump to meet the hydraulic fluid demand of the hydraulic system, without having to consider other functions of the working vehicle.

In exemplary embodiments, the hydraulic pump comprises a first port connected to a hydraulic reservoir and a second port connected to the first set of valves.

In other words, the hydraulic system is an open system. Advantageously, this allows extra hydraulic fluid to be added from the reservoir to the hydraulic system when required.

In exemplary embodiments, the hydraulic system further comprises a bypass line between the second port of the hydraulic pump or the first set of valves and a hydraulic fluid reservoir, wherein the hydraulic system is configured to direct hydraulic fluid along the bypass line when no hydraulic fluid is required by the one or more hydraulically actuated devices or auxiliary functions.

In this way, a build-up of pressure in the hydraulic system is prevented, since excess hydraulic fluid can return to the hydraulic fluid reservoir.

In exemplary embodiments, the bypass line comprises a pressure relief valve configured to automatically open when the pressure in the bypass line exceeds a certain pressure.

In exemplary embodiments, the hydraulic pump and/or the SAHR brake valve and/or the pilot line and/or the bypass line and/or the second set of valves and/or the power steering device are all connected to the same hydraulic fluid reservoir. This may offer a more simple solution than having a plurality of hydraulic fluid reservoirs.

According to a second aspect of the teachings a hydraulic system for a working vehicle is provided, the hydraulic system comprising:

one or more hydraulically actuated devices; and a hydraulic pump configured to supply hydraulic fluid to the one or more hydraulically actuated devices;

wherein the hydraulic pump is configured to operate in a low output/low pressure state when a flow of hydraulic fluid is not required by the one or more hydraulically actuated devices; and wherein the hydraulic system is configured to use hydraulic fluid supplied by the hydraulic pump in the low output state for one or more auxiliary functions of the hydraulic system.

By operating the hydraulic pump in a low output state rather than an 'off' state, a low flow rate of hydraulic fluid is instantaneously available when required by a hydraulically actuated device. This also reduces the time delay to ramp up to a higher output hydraulic pump state when a high flow rate of hydraulic fluid is required by a hydraulic actuator. These properties are useful for hydraulically actuated devices such as hydraulic power steering devices, since it is desirable for the user to feel the power steering assistance as soon as they turn the steering wheel, and to minimise the delay between turning the steering wheel and receiving the maximum power steering assistance.

By utilising hydraulic fluid supplied by the hydraulic pump in the low output state for one or more auxiliary functions of the hydraulic system, some of the energy that would otherwise be lost by operating the hydraulic pump in the low output state when a flow of hydraulic fluid is not required by the one or more hydraulically actuated devices can be recovered to be used elsewhere in the hydraulic system. This increases the efficiency of the hydraulic system.

According to a third aspect of the teachings, a hydraulic system for a working vehicle is provided, the hydraulic system comprising:

a hydraulic accumulator; a hydraulic pump configured to supply hydraulic fluid to the hydraulic accumulator; and a spring applied hydraulically released (SAHR) brake, wherein pressure in the hydraulic accumulator is used to release the SAHR brake.

In this way, the energy stored in the hydraulic accumulator can be used to release the SAHR brake. This results in a more efficient hydraulic system than one where a flow of hydraulic fluid must be constantly supplied to release a SAHR brake. For example, theoretical results have shown such a configuration may provide up to 51% energy saving in the SAHR brake system.

In addition, in the event of a power failure, the hydraulic accumulator offers a source of pressurised hydraulic fluid which can be used to release the SAHR brake (e.g. via a manual override), so that the working vehicle can be towed easily. This also allows the SAHR brake cable to be relieved of tension before any maintenance, if required.

According to a fourth aspect of the teachings, a hydraulic system for a working vehicle is provided, the hydraulic system comprising:

one or more hydraulically actuated devices;

a hydraulic accumulator;

a hydraulic pump configured to supply hydraulic fluid to the one or more hydraulically actuated devices and the hydraulic accumulator;

a set of valves comprising one or more directional control valves configured to direct hydraulic fluid towards one or more of the hydraulically actuated devices; and a pilot line located between the hydraulic accumulator and the set of valves, wherein the hydraulic system is configured to selectively alter the pressure in the pilot line in order to permit or inhibit movement of the set of valves.

In this way, the energy stored in the hydraulic accumulator can be used to permit or inhibit movement of the set of valves. This results in a more efficient hydraulic system than one where a pilot line is connected directly to the hydraulic pump.

In addition, in the event of a power failure or intentional shutdown of the hydraulic pump, the hydraulic accumulator offers a source of pressurised hydraulic fluid which can be used to permit movement of the set of valves. This allows hoses connecting one or more hydraulically actuated devices or auxiliary services to be connected to the tank via the second set of valves, so that they can be depressurised for removal or maintenance.

According to a fifth aspect of the teachings a hydraulic system for an electric working vehicle or hybrid working vehicle of the kind having an electric source of power and an alternative source of power is provided, the hydraulic system comprising:

a spring applied hydraulically released (SAHR) brake;

a hydraulic pump configured to supply hydraulic fluid to the SAHR brake in order to release the SAHR brake;

a SAHR brake valve positioned between the hydraulic pump and the SAHR brake, wherein the SAHR brake valve is a proportional control valve configured to control the state of the SAHR brake via moderating the flow of hydraulic fluid to the SAHR brake; and a control system configured to actuate the SAHR brake valve so that the SAHR brake supplements or replaces a regenerative braking function of the working vehicle, at least temporarily.

Supplementing or replacing a regenerative braking function of the working vehicle via actuation of the SAHR brake is useful for times when regenerative braking is not available. For example, when a battery of the working vehicle has recently been charged and the working vehicle travels down a long incline, regenerative braking may lead to overcharge/damage of the battery. In this instance, regenerative braking would be turned off to avoid damage, which could lead to unwanted acceleration of the working vehicle and/or excessive loading on manual brakes of the working vehicle. Turning off the regenerative braking may also result in the manual brakes being less responsive and feeling 'heavier'. Supplementing the regenerative braking with proportional actuation of the SAHR brake therefore improves the safety and braking 'feel' of the working vehicle.

According to a sixth aspect of the teachings, a hydraulic system for an electric working vehicle or hybrid working vehicle of the kind having an electric source of power and an alternative source of power is provided, the hydraulic system comprising:

a hydraulic accumulator;

a hydraulic pump configured to supply hydraulic fluid to the hydraulic accumulator; and a supplementary brake configured to supplement or replace a regenerative braking function of the working vehicle, at least temporarily, wherein pressure in the hydraulic accumulator is used to apply the supplementary brake.

In this way, the energy stored in the hydraulic accumulator can be used to apply the supplementary brake. This results in a more efficient hydraulic system than one where a flow of hydraulic fluid must be constantly supplied to apply a supplementary brake.

According to a seventh aspect of the teachings, a working vehicle is provided, the working vehicle comprising a hydraulic system according to any of the first to fifth aspects of the teachings.

According to an eighth aspect of the teachings, a method of operating a hydraulic system of an electric working vehicle or hybrid working vehicle of the kind having an electric source of power and an alternative source of power is provided, the method comprising:

operating a hydraulic pump of the hydraulic system in a low output when a flow of hydraulic fluid is not required by one or more hydraulically actuated devices of the working vehicle; and using hydraulic fluid supplied by the hydraulic pump in the low output state for one or more auxiliary functions of the hydraulic system.

By operating the hydraulic pump in a low output state rather than an 'off' state, a low flow rate of hydraulic fluid is instantaneously available when required by a hydraulically actuated device. This also reduces the time delay to ramp up to a higher output hydraulic pump state when a high flow rate of hydraulic fluid is required by a hydraulic actuator. These properties are useful for hydraulically actuated devices such as hydraulic power steering devices, since it is desirable for the user to feel the power steering assistance as soon as they turn the steering wheel, and to minimise the delay between turning the steering wheel and receiving the maximum power steering assistance.

By utilising hydraulic fluid supplied by the hydraulic pump in the low output state for one or more auxiliary functions of the hydraulic system, some of the energy that would otherwise be lost by operating the hydraulic pump in the low output state when a flow of hydraulic fluid is not required by the one or more hydraulically actuated devices can be recovered to be used elsewhere in the hydraulic system. This increases the efficiency of the hydraulic system.

In exemplary embodiments, the method further comprises operating the hydraulic pump of the hydraulic system in a higher output state when a flow of hydraulic fluid is required by one or more of the hydraulically actuated devices, wherein the output of the hydraulic pump in the higher output state is the lesser of: the flow rate of hydraulic fluid required by the one or more hydraulically actuated devices; and the maximum output flow rate of the hydraulic pump.

In other words, when a flow of hydraulic fluid is required by one or more of the hydraulically actuated devices, the hydraulic pump will be configured to supply the required flow rate of hydraulic fluid unless the required flow rate of hydraulic fluid is greater than the maximum output flow rate of the hydraulic pump. In this case, the hydraulic pump would operate at its maximum output flow rate until the required flow rate of hydraulic fluid decreases below the maximum output flow rate of the pump.

In exemplary embodiments, the method further comprises prioritising the flow of hydraulic fluid to a hydraulic power steering device of the working vehicle, when the flow rate required by the one or more hydraulically actuated devices is greater than the maximum output flow rate of the hydraulic pump.

In other words, when the hydraulic fluid demand of the power steering device and the other hydraulically actuated devices and/or auxiliary functions is greater than the supply of hydraulic fluid from the hydraulic pump, the hydraulic system will direct the required amount of hydraulic fluid to the power steering device, and any surplus flow will be directed to the other devices/functions. If the supply of hydraulic fluid from the hydraulic pump is less than the hydraulic fluid demand of the power steering device, all of the flow of hydraulic fluid will be directed to the power steering device.

In cases where there is sufficient flow of hydraulic fluid from the hydraulic pump to meet the hydraulic fluid demands of the power steering and other functions of the hydraulic system, the hydraulic system will direct hydraulic fluid to each hydraulically actuated device/function as required.

Power steering may be the most safety-critical function of a hydraulic system for a working vehicle. Therefore, prioritising flow to the hydraulic power steering device over other components reduces the chances of a vehicle accident due to steering issues.

In exemplary embodiments, the method further comprises supplying hydraulic fluid from the hydraulic pump in the low output state to a hydraulic accumulator of the hydraulic system.

In this way, some of the energy required to operate the hydraulic pump in the low output state is stored to be used by functions of the hydraulic system when required. This increases the efficiency of the hydraulic system.

In exemplary embodiments, the method further comprises selectively supplying hydraulic fluid from the hydraulic accumulator to a spring applied hydraulically released (SAHR) brake of the working vehicle, in order to release or apply the SAHR brake.

In this way, the energy stored in the hydraulic accumulator when the hydraulic pump is operating in the low output state can be used to power the auxiliary function of releasing the SAHR brake. This results in a more efficient hydraulic system than one where a flow of hydraulic fluid must be constantly supplied to release a SAHR brake. For example, theoretical results have shown such a configuration may provide up to 51% energy saving in the SAHR brake system.

In exemplary embodiments, the method further comprises selectively supplying hydraulic fluid from the hydraulic accumulator to a pilot line of the hydraulic system, in order to permit or inhibit movement of one or more valves of the hydraulic system.

In this way, the energy stored in the hydraulic accumulator when the hydraulic pump is operating in the low output state can be used to power the auxiliary function of permitting or inhibiting movement of one or more valves. This results in a more efficient hydraulic system than one where a pilot line is connected directly to the hydraulic pump.

In exemplary embodiments, the method further comprises selectively supplying hydraulic fluid from the hydraulic accumulator to a supplementary brake of the hydraulic system, wherein the supplementary brake is configured to supplement or replace a regenerative braking function of the working vehicle, at least temporarily.

BRIEF DESCRIPTION OF THE DRAWINGS

Embodiments are now described by way of example only with reference to the accompanying drawings, in which.

DETAILED DESCRIPTION

Figure 1:
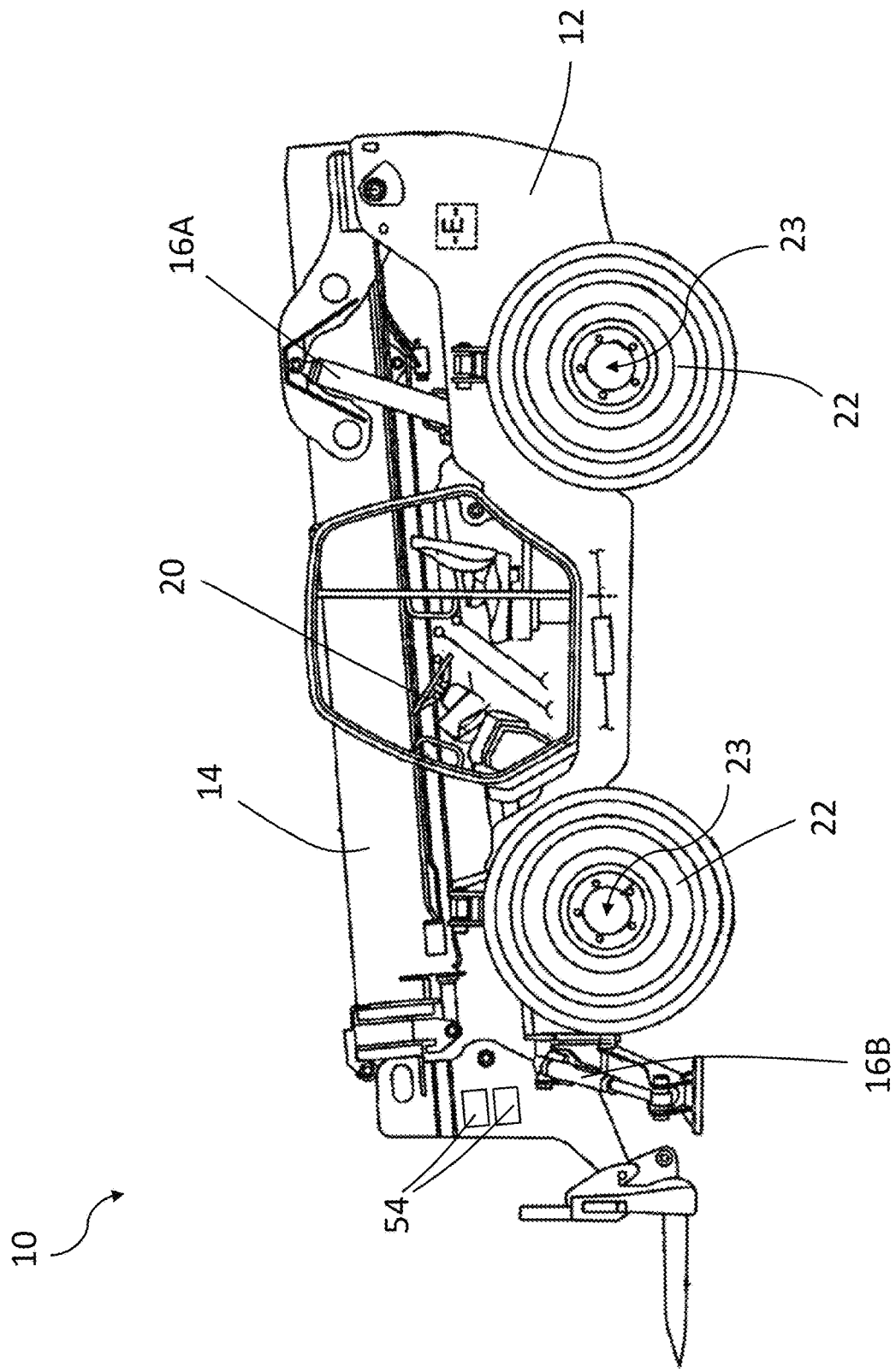
FIG. 1 is a side view of a working vehicle according to an embodiment.

Referring firstly to FIG. 1, a working vehicle according to an embodiment is indicated at 10. The working vehicle 10 includes a body 12 and a working arm 14 connected to the body 12. In the illustrated embodiment, the working vehicle 10 is a telehandler, but in alternative embodiments the working vehicle may be an excavator, backhoe loader or the like. The working vehicle 10 has a ground engaging structure in the form of four wheels 22 (two visible) mounted on two axles 23. In this embodiment, both axles are steered using an Ackermann type steering arrangement. In other embodiments, a single axle may be steered or steering may be effected by having axles mounted to two bodies that articulate relative to each other to effect steering, as is known for loading shovels and site dumpers, for example.

The working vehicle 10 has a number of hydraulically actuated devices 16 for actuating functions of the working vehicle 10. For example: a lifting actuator 16A is provided for raising or lowering the working arm 14; a stabilising actuator 16B is provided for deploying/stowing stabilisers 18 connected to an end of the body 12 of the working vehicle 10; and a hydraulic power steering device (not shown) is provided for assisting with movement of steered axles or articulation actuators, in order to avoid the steering being too heavy or slow for operator comfort.

The working vehicle 10 also includes a service hose connection port 54 for connecting an auxiliary hydraulically actuated attachment such as a grab or sweeper to the working vehicle 10.

In alternative embodiments, a different set of hydraulically actuated devices 16 and or service hose connections ports 54 to those described above may be provided.

The working vehicle 10 has an electrical energy store—in this embodiment a battery (not shown)—to provide an electric source of power. The battery is used to power one or more electric driving motors (not shown) to move the wheels 22 of the vehicle 10. In some embodiments, the working vehicle may also comprise an alternative source of power (e.g. an internal combustion engine) to provide power to the wheels 22 or charge the battery.

Figure 2:
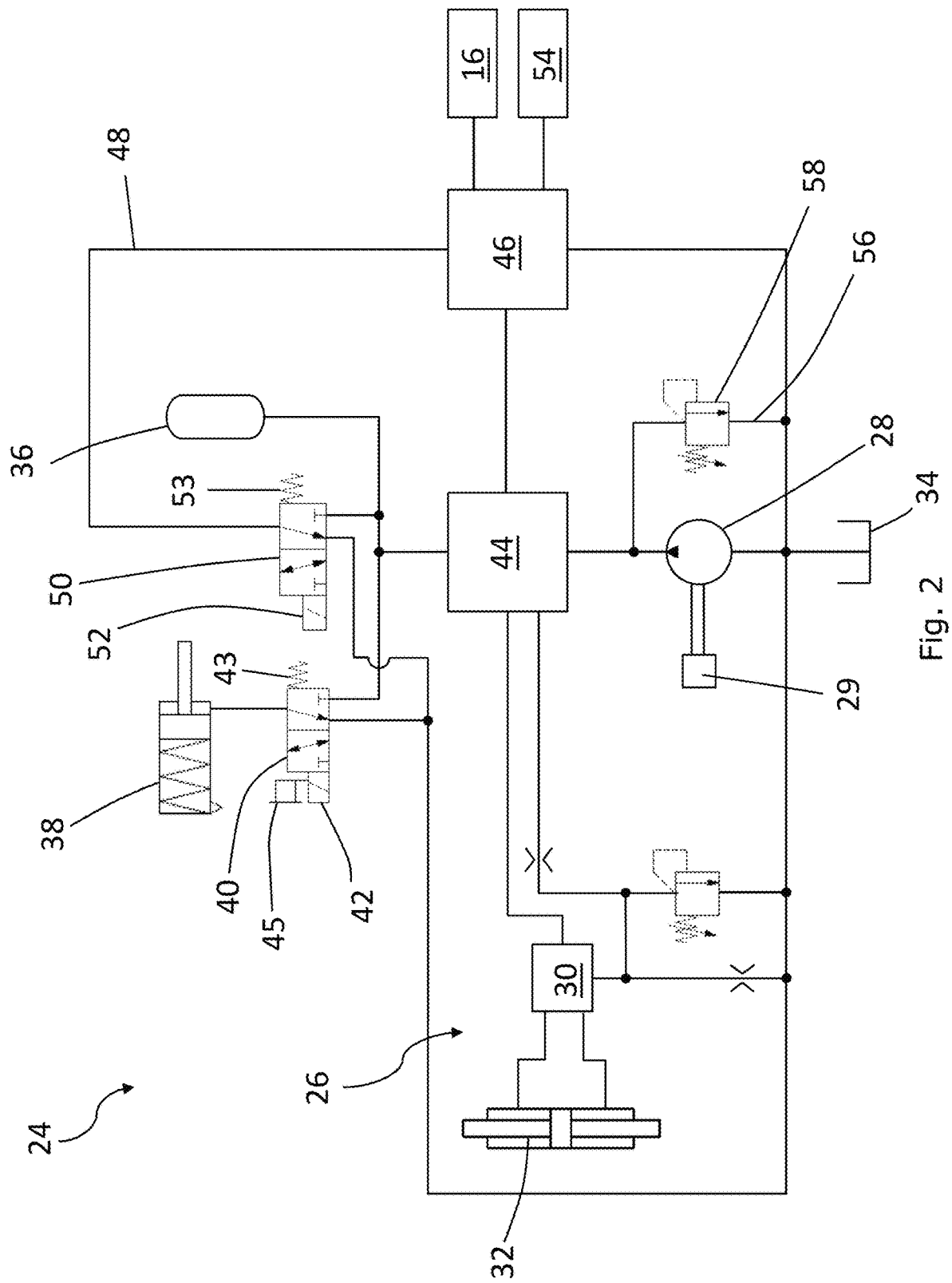
FIG. 2 shows a hydraulic system for the working vehicle of FIG. 1, according to an embodiment.

Referring now to FIG. 2, a hydraulic system of the working vehicle 10 is indicated at 24. The hydraulic system 24 includes hydraulically actuated devices 16 (e.g. actuators 16A and 16B as described above in relation to FIG. 1) and 26. As will be described in detail below, hydraulically actuated device 26 is a hydraulic power steering device. In alternative embodiments, one of the power steering device 26 or the other hydraulically actuated devices 16 may be omitted.

The hydraulic system 24 includes a hydraulic pump 28 configured to supply hydraulic fluid from a hydraulic reservoir 34 to the hydraulically actuated devices 16, 26. More specifically, the hydraulic pump 28 includes a first port connected to the hydraulic reservoir 34 and a second port connected to a first set of valves 44 (which will be described in more detail below). In other words, the hydraulic system 24 is an open system. Advantageously, this allows extra hydraulic fluid to be added from the hydraulic reservoir 34 to the hydraulic system 24 when required.

The hydraulic system 24 includes an electric motor 29 configured to drive the hydraulic pump 28. Advantageously, an electric motor 29 can be sped up or slowed down, as required, in order to vary the output of the hydraulic pump 28 to meet the hydraulic fluid demand of the hydraulic system 24. This contrasts with a hydraulic pump in a traditional ICE powered vehicle, whose output is determined by the speed of the engine (assuming a fixed displacement pump is used, rather than a complex and expensive variable displacement pump).

In the illustrated embodiment, the electric motor 29 is a dedicated hydraulic pump driving motor. In other words, the electric motor 29 does not drive other functions of the working vehicle, such as an electric propulsion system. In this way, the electric motor 29 can be sped up or slowed down, as required, in order to vary the output of the hydraulic pump to meet the hydraulic fluid demand of the hydraulic system, without having to consider other functions of the working vehicle 10.

The hydraulic pump 28 is configured to operate in a low output state when a flow of hydraulic fluid is not required by the hydraulically actuated devices 16, 26. As will be described in more detail below, the hydraulic system 24 is configured to use hydraulic fluid supplied by the hydraulic pump 28 in the low output state for one or more auxiliary functions of the hydraulic system 24.

By operating the hydraulic pump 28 in a low output state rather than an 'off' state, a low flow rate of hydraulic fluid is instantaneously available when required by a hydraulically actuated device 16, 26. This also reduces the time delay to ramp up to a higher output hydraulic pump state when a high flow rate of hydraulic fluid is required by a hydraulically actuated device 16, 26. These properties are particularly useful for the hydraulic power steering device 26, since it is desirable for the user to feel the power steering assistance as soon as they turn the steering wheel 20, and to minimise the delay between turning the steering wheel 20 and receiving the maximum power steering assistance.

By utilising hydraulic fluid supplied by the hydraulic pump 28 in the low output state for one or more auxiliary functions of the hydraulic system 24, some of the energy that would otherwise be lost by operating the hydraulic pump 28 in the low output state when a flow of hydraulic fluid is not required by the hydraulically actuated devices 16, 26 can be recovered to be used elsewhere in the hydraulic system 24. This increases the efficiency of the hydraulic system 24. This is particularly desirable for working vehicles 10 that are at least partially powered from electrical energy stored on board the vehicle in batteries or the like, since the energy density of batteries is lower than diesel, for example. To avoid too short intervals between battery exhaustion, it is desirable not to waste electrical energy unnecessarily.

In some embodiments, the output of the hydraulic pump 28 in the low output state is less than 50% of the maximum output of the hydraulic pump 28. In some embodiments, the output of the hydraulic pump 28 in the low output state is less than 25% of the maximum output of the hydraulic pump 28. In some embodiments, the output of the hydraulic pump 28 in the low output state is in a range of 5% to 20% of the maximum output of the hydraulic pump 28. Having such a level of output in the low output state has been found to be a good tradeoff between conserving power and reducing the time delay to ramp up to a higher output state when required.

In some embodiments, the output of the hydraulic pump 28 in the low output state is less than a maximum demand of hydraulic fluid from the hydraulic power steering device 26. In some embodiments, the output of the hydraulic pump 28 in the low output state is in a range of 30% to 70% of a maximum demand of hydraulic fluid from the hydraulic power steering device 26. In some embodiments, the output of the hydraulic pump 28 in the low output state is substantially 50% of a maximum demand of hydraulic fluid from the hydraulic power steering device 26. Having such a level of output in the low output state has been found to be a good tradeoff between conserving power and reducing the time delay to ramp up to a higher output state when required by the hydraulic power steering device 26 or other hydraulically actuated devices 16. In addition, such a level of output in the low output state provides an instantaneous flow rate of hydraulic fluid to the hydraulic power steering device 26 when a user steers the working vehicle 10, so that the user feels the power steering assistance as soon as they turn the steering wheel 20.

The hydraulic pump 28 is configured to operate in a higher output state when a flow of hydraulic fluid is required by one or more of the hydraulically actuated devices 16, 26. The output of the hydraulic pump 28 in the higher output state is the lesser of: the flow rate of hydraulic fluid required by the hydraulically actuated devices 16, 26; and the maximum output flow rate of the hydraulic pump 28.

In other words, when a flow of hydraulic fluid is required by one or more of the hydraulically actuated devices, the hydraulic pump 28 will be configured to supply the required flow rate of hydraulic fluid unless the required flow rate of hydraulic fluid is greater than the maximum output flow rate of the hydraulic pump 28. In this case, the hydraulic pump 28 would operate at its maximum output flow rate until the required flow rate of hydraulic fluid decreases below the maximum output flow rate of the pump 28.

In the illustrated embodiment, the hydraulic power steering device 26 consists of a steering orbitrol 30 connected to a double rod hydraulic cylinder 32 connected to left and right wheels 22 of the working vehicle 10.

In alternative embodiments, the hydraulic power steering device 26 includes a second double rod hydraulic cylinder connected to left and right wheels 22 of a second axle of the working vehicle. This arrangement enables four wheel steering, or crab steering, if required by the working vehicle 10.

In alternative embodiments, the hydraulic power steering device 26 consists of a steering orbitrol 30 connected to two hydraulic cylinders connected to left and right wheels 22 of the working vehicle 10.

In alternative embodiments, the hydraulic power steering device 26 includes two more hydraulic cylinders connected to left and right wheels 22 of a second axle of the working vehicle 10. This arrangement enables four wheel steering, or crab steering, if required by the working vehicle 10.

The steering orbitrol 30 is also connected to the hydraulic fluid reservoir 34. In this way, when hydraulic fluid needs to be removed from the hydraulic steering cylinder(s) 32, it can be directed via the orbitrol 30 to the hydraulic reservoir 34.

The hydraulic system 24 also includes a hydraulic accumulator 36. The hydraulic system 24 is configured to supply hydraulic fluid from the hydraulic pump 28 in the low output state to the hydraulic accumulator 36. In this way, some of the energy required to operate the hydraulic pump 28 in the low output state is stored to be used by functions of the hydraulic system 24 when required. This increases the efficiency of the hydraulic system 24.

The hydraulic system 24 also includes a spring applied hydraulically released (SAHR) brake 38. Pressure in the hydraulic accumulator 36 is used to release the SAHR brake 38. SAHR brakes are commonly used in working vehicles as they provide a failsafe brake in the event of a failure of the hydraulic system. In this way, the energy stored in the hydraulic accumulator 36 when the hydraulic pump 28 is operating in the low output state can be used to power the auxiliary function of releasing the SAHR brake 38. This results in a more efficient hydraulic system 24 than one where a flow of hydraulic fluid must be constantly supplied to release a SAHR brake 38. For example, theoretical results have shown such a configuration may provide up to 51% energy saving in the SAHR brake 38 system.

The hydraulic system 24 also includes a SAHR brake valve 40 positioned between the hydraulic accumulator 36 and the SAHR brake 38. As will be described in detail below, the SAHR brake valve 40 is configured to control the state of the SAHR brake 38 via selectively permitting or blocking a flow of hydraulic fluid from the hydraulic accumulator 36 to the SAHR brake 38.

In the illustrated embodiment, the SAHR brake valve 40 includes a first port connected to the SAHR brake 38, a second port connected to the hydraulic accumulator 36 and a third port connected to the hydraulic fluid reservoir 34. The SAHR brake valve 40 is configured to control the state of the SAHR brake 38 via selectively connecting the first port to the second or third ports. In this way, the SAHR brake valve 40 is configured to release the SAHR brake 38 via permitting flow of hydraulic fluid between the hydraulic accumulator 36 (port 2) and the SAHR brake 38 (port 1), and blocking flow of hydraulic fluid between the SAHR brake 38 (port 1) and the hydraulic fluid reservoir 34 (port 3). Similarly, the SAHR brake valve 40 is configured to apply the SAHR brake 38 via permitting flow of hydraulic fluid between the SAHR brake 38 (port 1) and the hydraulic reservoir 34 (port 3), and blocking flow of hydraulic fluid between the hydraulic accumulator 36 (port 2) and the SAHR brake 38 (port 1).

In the illustrated embodiment, the hydraulic system 24 includes a SAHR brake valve solenoid 42 configured to control the state of the SAHR brake valve 40. This provides a flexible variety of control options. The SAHR brake valve solenoid 42 is configured to move the SAHR brake valve 40 to the first position (in which port 1 is connected to port 2), against the action of a spring 43 which is configured to bias the SAHR brake valve 40 towards the second position (in which port 1 is connected to port 3).

In alternative embodiments, the SAHR brake valve 40 may be controlled by other means different to the solenoid 42 and spring 43 arrangement described above.

In some embodiments, the SAHR brake valve 40 can be actuated via a hand brake, lever, switch or other user input (not shown) of the working vehicle 10. In this way, the user has control over the state of the SAHR brake 38.

In some embodiments, the SAHR brake valve 40 can be actuated automatically via a control system. In this way, the control system may apply the SAHR brake 38 independently of the user inputs. This may improve safety and improve efficiency. For example, the control system may apply the SAHR brake 38 when it detects the working vehicle 10 is on a hill and is not moving. This prevents unintentional rolling of the vehicle 10 (improved safety) and removes the need to use one or more electric drive motors to hold the vehicle 10 stationary (improves efficiency).

In some embodiments, the SAHR brake valve 40 is a proportional valve. This allows the SAHR brake 38 to be applied proportionally, rather than just being fully "on" or fully "off".

Electric or hybrid vehicles of embodiments of the present teachings are provided with a regenerative braking function to retard vehicle motion and conserve electrical energy. In such embodiments, the control system may be configured to actuate the SAHR brake valve 40 so that the SAHR brake 38 supplements or replaces the regenerative braking function of the working vehicle 10, at least temporarily. Supplementing or replacing the regenerative braking function of the working vehicle 10 via actuation of the SAHR brake 38 is useful for times when regenerative braking is not available. For example, when the battery (not shown) of the working vehicle 10 has recently been charged and the working vehicle 10 travels down a long incline, regenerative braking may lead to overcharge/damage of the battery. In this instance, regenerative braking would be turned off to avoid damage, which could lead to unwanted acceleration of the working vehicle 10 and/or excessive loading on manual brakes of the working vehicle. Turning off the regenerative braking may also result in the manual brakes being less responsive and feeling 'heavier'. Supplementing the regenerative braking with proportional actuation of the SAHR brake 38 therefore improves the safety and braking 'feel' of the working vehicle 10.

In the illustrated embodiment, the SAHR brake valve 40 can be actuated via a manual override input 45 of the working vehicle 10. The manual override input 45 is configured to control the state of the SAHR brake valve 40 in the event of a power failure. In this way, in the event of a power failure, the manual override input 45 can be used to release the SAHR brake 38, so that the working vehicle 10 can be towed easily. This also allows the SAHR brake cable to be relieved of tension before any maintenance, if required.

In some embodiments, a pressure transducer (not shown) is provided to detect pressure in the hydraulic line supplying the SAHR brake 38 (e.g. between SAHR brake valve 40 and SAHR brake 38). This gives an indication of the state of the SAHR brake 38 which can be used, for example, to alert the operator if the SAHR brake 38 has not been successfully released due to a hose burst, valve blockage, or other malfunction.

In some embodiments, one or more pressure transducers (not shown) are provided to detect pressure in the hydraulic accumulator 36 and/or at other portions of the hydraulic system 24. In such embodiments, a warning may be provided to an operator if pressure in the hydraulic accumulator 36 and/or other portions of the hydraulic system drops below a threshold level (e.g. below 20 bar), for example, due to a hose burst, valve blockage or other malfunction.

As will be described in more detail below in relation to FIGS. 2 and 3, the hydraulic system 24 includes a first set of valves 44 consisting of one or more directional control valves. The first set of valves 44 is configured to direct hydraulic fluid to the hydraulically actuated devices 16, 26 and/or auxiliary functions of the hydraulic system. In this way, hydraulic fluid can be directed around the hydraulic system 24 as required.

In the illustrated embodiment, the first set of valves 44 is provided in a single valve block, which may be more compact and simpler to connect to a hydraulic system 24 than a plurality of valve blocks connected together. In alternative embodiments, a plurality of individual valve blocks may be provided for the first set of valves 44.

The hydraulic system 24 is configured to control the state of the first set of valves 44 to prioritise flow to the hydraulic power steering device 26. In other words, when the hydraulic fluid demand of the power steering device 26 and the other hydraulically actuated devices 16 and/or auxiliary functions is greater than the supply of hydraulic fluid from the hydraulic pump 28, the first set of valves 44 will direct the required amount of hydraulic fluid to the power steering device 26, and any surplus flow will be directed to the other devices 16 or functions. If the supply of hydraulic fluid from the hydraulic pump 28 is less than the hydraulic fluid demand of the power steering device 26, all of the flow of hydraulic fluid will be directed to the power steering device 26. In cases where there is sufficient flow of hydraulic fluid from the hydraulic pump 28 to meet the hydraulic fluid demands of the power steering and other functions of the hydraulic system, the first set of valves 44 will direct hydraulic fluid to each hydraulically actuated device 16, 26 and or function as required.

Power steering is a more safety-critical function of a hydraulic system for a working vehicle than actuating working arms, for example. Therefore, prioritising flow to the hydraulic power steering device 26 over other components ensures an operator has adequate control of the working vehicle 10 when in motion.

The hydraulic system 24 also includes a second set of valves 46 consisting of one or more directional control valves (not shown). The second set of valves 46 is configured to direct hydraulic fluid towards one or more of the hydraulically actuated devices 16.

In the illustrated embodiment, the second set of valves 46 is provided in a single valve block, which may be more compact and simpler to connect to a hydraulic system 24 than a plurality of valve blocks connected together. In alternative embodiments, a plurality of individual valve blocks may be provided for the second set of valves 46.

The hydraulic system 24 also includes a pilot line 48 located between the hydraulic accumulator 36 and the second set of valves 46. As will be described in detail below, the hydraulic system 24 is configured to selectively alter the pressure in the pilot line 48 in order to permit or inhibit movement of the second set of valves 46. In this way, the energy stored in the hydraulic accumulator 36 when the hydraulic pump 28 is operating in the low output state can be used to power the auxiliary function of permitting or inhibiting movement of the second set of valves 46. This results in a more efficient hydraulic system 24 than one where a pilot line is connected directly to the hydraulic pump 28.

The hydraulic system 24 includes a pilot line isolation valve 50 positioned between the hydraulic accumulator 36 and the second set of valves 46. As will be described in more detail below, the pilot line isolation valve 50 is configured to permit or inhibit movement of the second set of valves 46 via selectively permitting or blocking a flow of hydraulic fluid from the hydraulic accumulator 36 to the second set of valves 46. This provides a mechanism for isolating the second set of valves 46. Advantageously, this may improve safety. For example, in the event that a dangerous situation is detected, the second set of valves 46 may be isolated to instantly prevent actuation of the one or more hydraulically actuated devices 16 connected thereto. The ability to inhibit movement of the second set of valves can also be used to prevent inadvertent movement of the working arm 14 and or hydraulically actuated devices.

In some embodiments, the working vehicle includes an immobilisation system (not shown), and the hydraulic system is configured to actuate the pilot line isolation valve 50 so that the flow of hydraulic fluid from the hydraulic accumulator 36 to the second set of valves 46 is blocked (i.e. the second set of valves cannot be operated) unless a pass-code, key or the like is input to the immobilisation system.

The pilot line isolation valve 50 includes a first port connected to the second set of valves 46, a second port connected to the hydraulic accumulator 36 and a third port connected to a hydraulic fluid reservoir 34. The pilot line isolation valve 50 is configured to permit or inhibit movement of the second set of valves 46 via selectively connecting the first port to the second or third ports. In this way, the pilot line isolation valve 50 is configured to pressurise the pilot line 48 to permit movement of the second set of valves 46 by permitting flow of hydraulic fluid between the hydraulic accumulator 36 (port 2) and the second set of valves 46 (port 1), and blocking flow of hydraulic fluid between the second set of valves 46 (port 1) and the hydraulic fluid reservoir 34 (port 3). Similarly, the pilot line isolation valve 50 is configured to de-pressurise the pilot line 48 to inhibit movement of the second set of valves 46 by permitting flow of hydraulic fluid between the second set of valves 46 (port 1) and the hydraulic reservoir 34 (port 3), and blocking flow of hydraulic fluid between the hydraulic accumulator 36 (port 2) and the second set of valves 46 (port 1).

In the illustrated embodiment, the hydraulic system 24 includes a pilot line isolation valve solenoid 52 configured to control the state of the pilot line isolation valve 50. This provides a flexible variety of control options. The pilot line isolation valve solenoid 52 is configured to move the pilot line isolation valve 50 to the first position (in which port 1 is connected to port 2), against the action of a spring 53 which is configured to bias the pilot line isolation valve 50 towards the second position (in which port 1 is connected to port 3).

In alternative embodiments, the pilot line isolation valve 50 may be controlled by other means different to the solenoid 52 and spring 53 arrangement described above.

In some embodiments, the pilot line isolation valve 50 can be actuated via a lever, switch or other user input (not shown) of the working vehicle 10. In this way, the user has control over the isolation of the second set of valves 46.

In some embodiments, the pilot line isolation valve 50 can be actuated automatically via a control system. In this way, the control system may isolate the second set of valves 46 independently of the user inputs. This may improve safety (e.g. if the control system isolates the second set of valves 46 when it detects a dangerous situation, such as an object blocking movement of the working arm 14).

The hydraulic system 24 also includes one or more service hose connection ports 54 coupled to the second set of valves 46. This provides the option to provide hydraulic fluid to additional hydraulic services which are not always connected to the working vehicle 10. For example, it may be desirable to connect an attachment such as a grab or sweeper (not shown) to the working vehicle 10, which utilises hydraulic fluid in its operation.

A user input (not shown) is provided to stop the hydraulic pump 28. For example, a button, switch, lever or the like may be provided on the working vehicle 10. When connecting hoses to or disconnecting hoses from the service hose connection port(s) 54, it is desirable to depressurise the hoses and hydraulic lines upstream of the service hose connection port(s) 54, to prevent leaking of hydraulic fluid and to reduce the force required to make the physical connection of hoses to the port(s). The hydraulic accumulator 36 stores pressurised hydraulic fluid, which can be used to provide a flow of hydraulic fluid to pressurise the pilot line 48, even when the hydraulic pump 28 has been stopped. In this way, the pilot line 48 can be pressurised to permit movement of the second set of valves 46. This allows the service hose connection port 54 and/or service hose connected thereto to be de-pressurised by connecting to the hydraulic reservoir 34 via the second set of valves 46 (e.g. via operating the pilot line isolation valve solenoid 52).

As has been described in relation to FIG. 1 above, the hydraulically actuated devices 16 include one or more working arm actuators (e.g. 16A). These working arm actuators are connected to the second set of valves 46 and the second set of valves 46 is configured to direct hydraulic fluid to the one or more working arm actuators in order to control movement of the working arm 14 of the working vehicle 10, to perform a work operation such as lifting, tipping, digging etc.

In the illustrated embodiment, the hydraulic system 24 includes a bypass line 56 between the second port of the hydraulic pump 28 and the hydraulic fluid reservoir 34. The hydraulic system is configured to direct hydraulic fluid along the bypass line 56 when no hydraulic fluid is required by the hydraulically actuated devices 16, 26 or auxiliary functions.

In this way, a build-up of pressure in the hydraulic system 24 is prevented, since excess hydraulic fluid can return to the hydraulic fluid reservoir 34.

In alternative embodiments, the bypass line 56 is positioned between the first set of valves 44 and the hydraulic fluid reservoir. In alternative embodiments, the bypass line 56 is positioned between the second set of valves 46 and the hydraulic fluid reservoir.

In the illustrated embodiment, the bypass line includes a pressure relief valve 58 configured to automatically open when the pressure in the bypass line 56 exceeds a certain pressure.

In the illustrated embodiment, the hydraulic pump 28, the SAHR brake valve 40, the pilot line isolation valve 50, the bypass line 56, the second set of valves 46 and the power steering device 26 are all connected to the same hydraulic fluid reservoir 34. In alternative embodiments, multiple hydraulic fluid reservoirs may be provided and different elements of the hydraulic system 24 described above may be connected to different hydraulic reservoirs.

Figure 3:
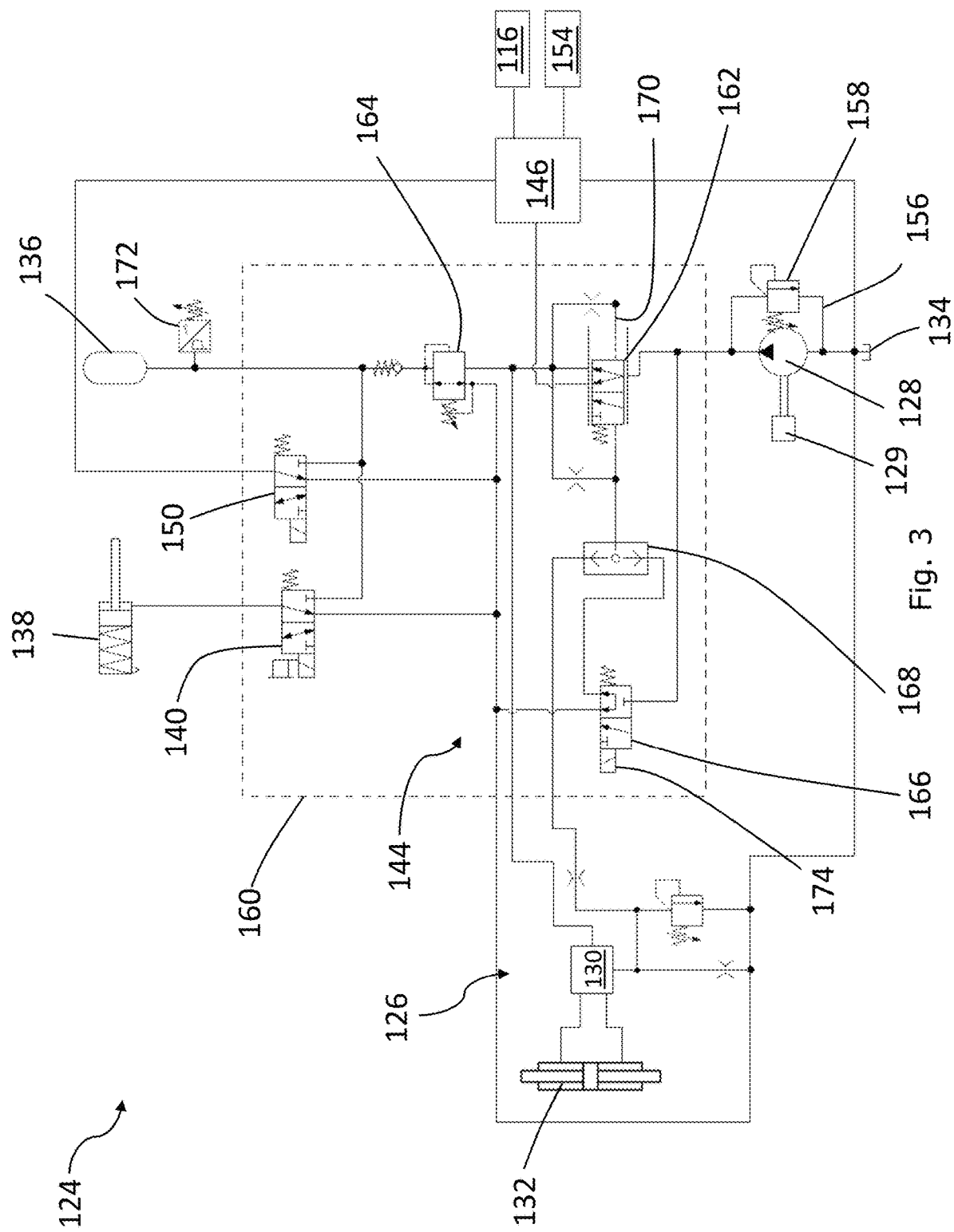
FIG. 3 shows the hydraulic system of FIG. 2 with the first set of valves arranged according to an embodiment.

Referring now to FIG. 3, an alternative hydraulic system is indicated at 124. Corresponding components between the hydraulic systems of FIGS. 3 and 2 are labelled with the prefix "1", and only differences are discussed.

In the illustrated embodiment, the SAHR brake valve 140, the first set of valves 144 and the pilot line isolation valve 150 are provided in a single valve block 160. The single valve block 160 may be more compact and simpler to connect to a hydraulic system 24 than a plurality of valve blocks connected together.

In the illustrated embodiment, the first set of valves 144 includes a directional control valve 162 configured to selectively direct hydraulic fluid supplied by the hydraulic pump 128 to an accumulator pressure control valve 164, the power steering device 126 and the second set of valves 146.

The directional control valve 162 has a first state, in which hydraulic fluid is supplied only to the accumulator pressure control valve 164 and the power steering device 126, and a second state, in which hydraulic fluid is also supplied to the second set of valves 146 as well. The directional control valve 162 is spring-biased towards the first state. A pilot line 170 is taken from the hydraulic line connecting the directional control valve 162 to the accumulator pressure control valve 164 and the power steering device 126. The pilot line 170 is used to act against the spring-biasing force of the directional control valve 162, to push the directional control valve 162 towards the second state. In this way, the directional control valve 162 is configured to prioritise the flow of hydraulic fluid from the hydraulic pump 128 to the hydraulic power steering device 126. Only when the hydraulic pump 128 is providing sufficient hydraulic fluid to meet the demands of the power steering device 126 and the hydraulically actuated devices 116 connected to the second set of valves 146 will the directional control valve permit a flow of hydraulic fluid to the second set of valves 146. In FIG. 3, the directional control valve is shown in the second state.

As will be described in detail below, the accumulator pressure control valve 164 is moveable between a charging position (in which the hydraulic accumulator 136 receives hydraulic fluid supplied by the hydraulic pump 128 via the directional valve 162), and a closed position (in which the hydraulic accumulator 136 is isolated from the hydraulic pump 128 and directional control valve 162). In FIG. 3, the accumulator pressure control valve 164 is in the closed position.

In the illustrated embodiment, the accumulator pressure control valve 164 is spring-biased towards the charging position. A pilot line 165 is provided between the accumulator pressure control valve 164 and hydraulic line downstream of the accumulator pressure control valve 164. Pressure in pilot line 165 acts against the spring-biasing force of the accumulator pressure control valve 164. In this way, when the hydraulic accumulator 136 is sufficiently charged with pressurised hydraulic fluid, the pressure in pilot line 165 is sufficient to move the accumulator pressure control valve 164 to the closed position. When the pressure in the hydraulic accumulator 136 falls, so does the pressure in the pilot line 165, which allows the spring-biasing force to move the accumulator pressure control valve to the charging position.

In alternative embodiments, the accumulator pressure control valve 164 may be solenoid operated and the state of the accumulator pressure control valve 164 may be changed through actuation of the solenoid. In such an arrangement, a pressure switch (e.g. 172) may be provided as an input to control actuation of the solenoid. In further embodiments, the accumulator pressure control valve 164 may be any type of valve configuration that allows movement between a charging and closed position in response to changes in pressure in the hydraulic accumulator 136.

The accumulator pressure control valve 164 as described above, provides a safety feature to ensure that there is sufficient pressure to actuate the SAHR brake 138. In some embodiments, a pressure switch may be provided to check pressure in the SAHR brake line (e.g. between the SAHR brake valve 140 and the SAHR brake 138). This provides an additional redundant safety feature, to check that the pressure in the SAHR brake line is as expected, based on the inputs supplied to the motor 129 and solenoids (e.g. 42, 52, 174). This provides a means for determining that the SAHR brake is functioning correctly.

A charging spool 166 and shuttle valve 168 are provided to control the state of the accumulator pressure control valve 164 and the directional control valve 162, as will be described in relation to FIG. 4 below. The charging spool 166 includes a charging state and a non-charging state. In the illustrated embodiment, the charging spool 166 is spring-biased towards the non-charging state and a charging spool solenoid 174 is provided for acting against the spring-biasing force to move the charging spool 166 to the charging state. In the illustrated embodiment, the hydraulic system 124 includes a pressure switch 172 connected to the hydraulic accumulator 136. When the pressure in the hydraulic accumulator 136 drops below a threshold level, the pressure switch 172 triggers the charging spool solenoid 174 to set the charging spool 166 to the charging state. In FIG. 3, the hydraulic system 124 is shown with the charging spool 166 in the non-charging state.

Figure 4:
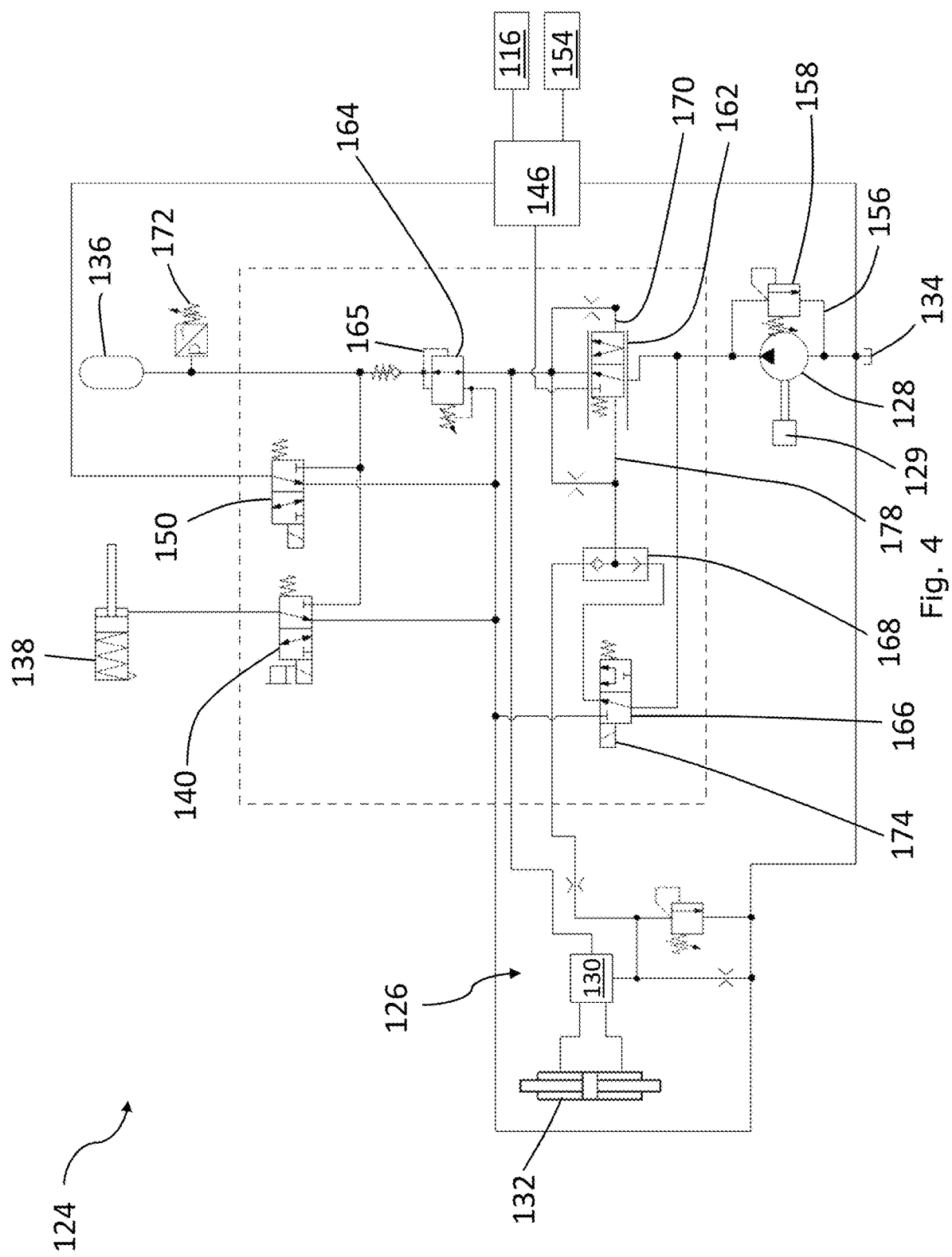
FIG. 4 shows the hydraulic system of FIG. 3 with the valves in a different state.

Referring now to FIG. 4, the hydraulic system 124 of FIG. 3 is shown with the charging spool 166 in the charging state. This causes hydraulic fluid provided by the hydraulic pump 128 to be supplied via the charging spool 166 and shuttle valve 168 to a second pilot line 178 of the directional control valve 162. By pressurising this second pilot line 178, the directional control valve 162 is moved to its first state in which hydraulic fluid is not supplied to the second set of valves 146. Since the charging spool 166 transitioning to the charging state is triggered by a low pressure in the hydraulic accumulator 136, pressure in the accumulator pressure control valve pilot line 165 will also be low, which means that the accumulator pressure control valve 164 is also in the charging state (as described in detail above). This allows hydraulic fluid to be supplied to the hydraulic accumulator 136.

Figure 5:
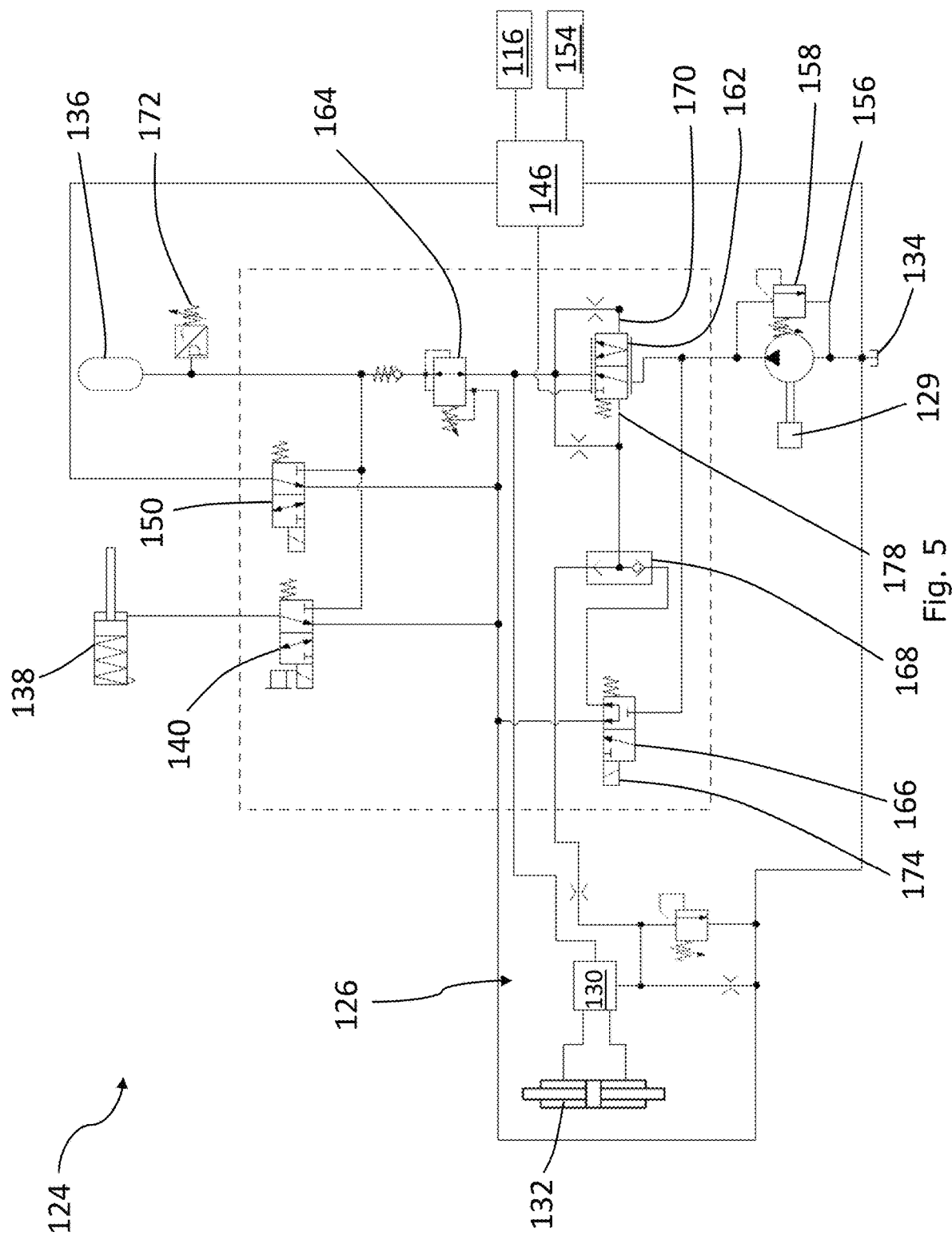
FIG. 5 shows the hydraulic system of FIGS. 3 and 4 with the valves in a different state.

Referring now to FIG. 5, the hydraulic system 124 of FIGS. 3 and 4 is shown with the charging spool 166 in the non-charging position and the directional control valve 162 in the first state. This configuration is used when the power steering device 126 is being actuated and the flow of hydraulic fluid supplied by the hydraulic pump 128 is not sufficient to meet the demand for hydraulic fluid of the power steering device 126 as well as the hydraulically actuated devices 116 connected to the second set of valves 146. When the hydraulic system 124 is in this state, the motor 129 would be sped up until the hydraulic pump 128 is supplying sufficient hydraulic fluid for the hydraulic system 124 to transition back to the state shown in FIG. 3. In other words, the state of FIG. 5 is typically only a transient state.

Figure 6:
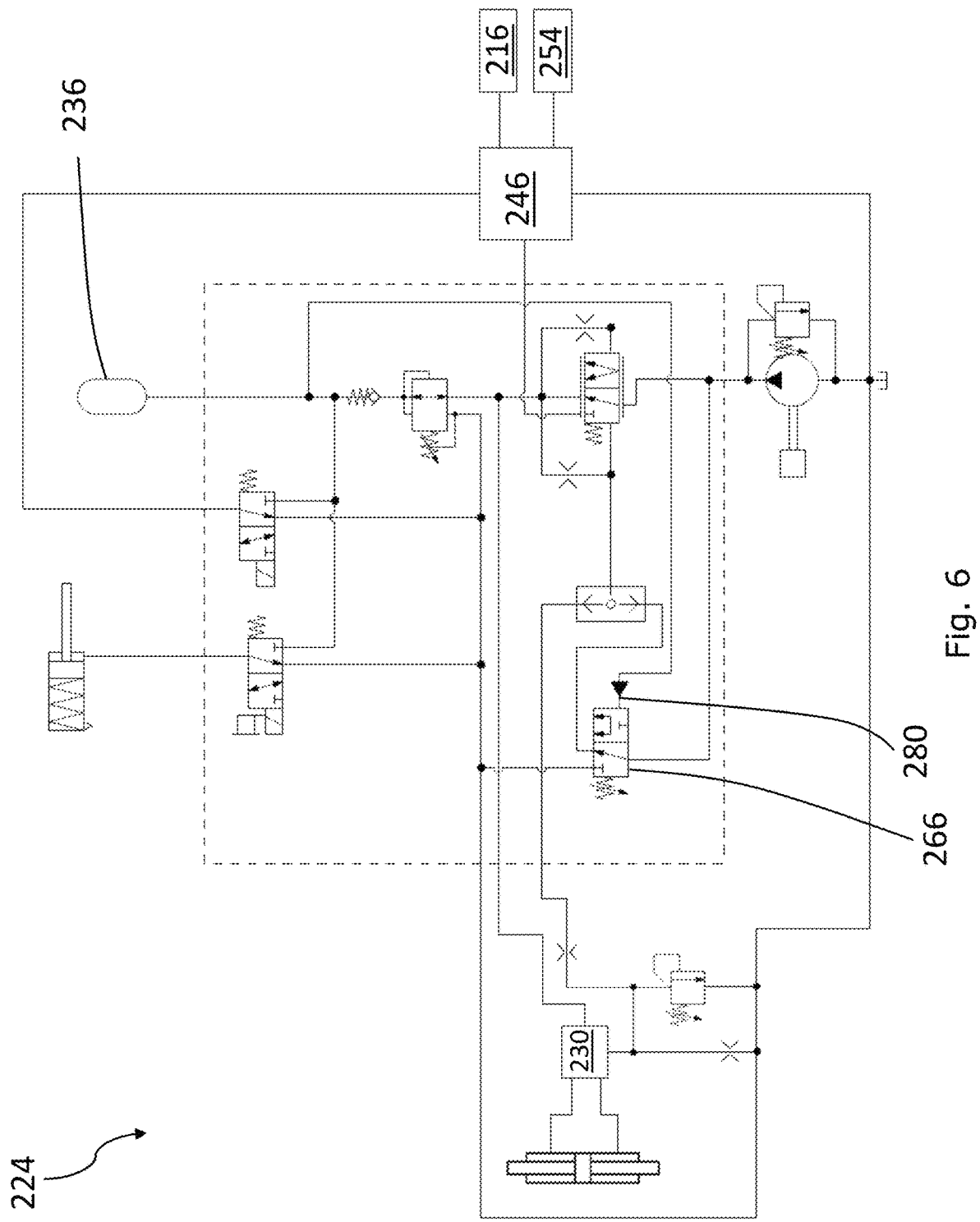
FIG. 6 shows the hydraulic system of FIG. 2 with the first set of valves arranged according to a further embodiment.

Referring now to FIG. 6, an alternative hydraulic system is indicated at 224. Corresponding components between the hydraulic systems of FIGS. 2 to 5 are labelled with the prefix "2", and only differences are discussed.

In the illustrated embodiment, the charging spool 266 has a charging state and a non-charging state (as in charging spool 166 of FIGS. 3 to 5). However, in this embodiment, the charging spool 266 is spring-biased towards the charging state rather than the non-charging state. A charging spool pilot line 280 is connected to the charging spool 266. Increasing the pressure of this pilot line 280 produces a force which acts against the spring-biasing force of the charging spool 266 to move the charging spool 266 to the non-charging state.

The charging spool pilot line 280 is connected to the hydraulic accumulator 236. In this way, when the pressure in the hydraulic accumulator drops below a threshold level, the pressure in pilot line 280 drops so that the charging spool 266 is moved to the charging state via the spring-biasing force. This causes the hydraulic accumulator 236 to be charged until the pressure in the hydraulic accumulator 236 and in the charge spool pilot line 280 rises above the threshold, which causes the charging spool 266 to move back to the non-charging state.

By using the charging spool pilot line 280 to control the state of the charging spool, no charging spool solenoid or pressure switch is required. This may result in a more reliable, safer, lower cost and simple hydraulic system 224.

Figure 7:
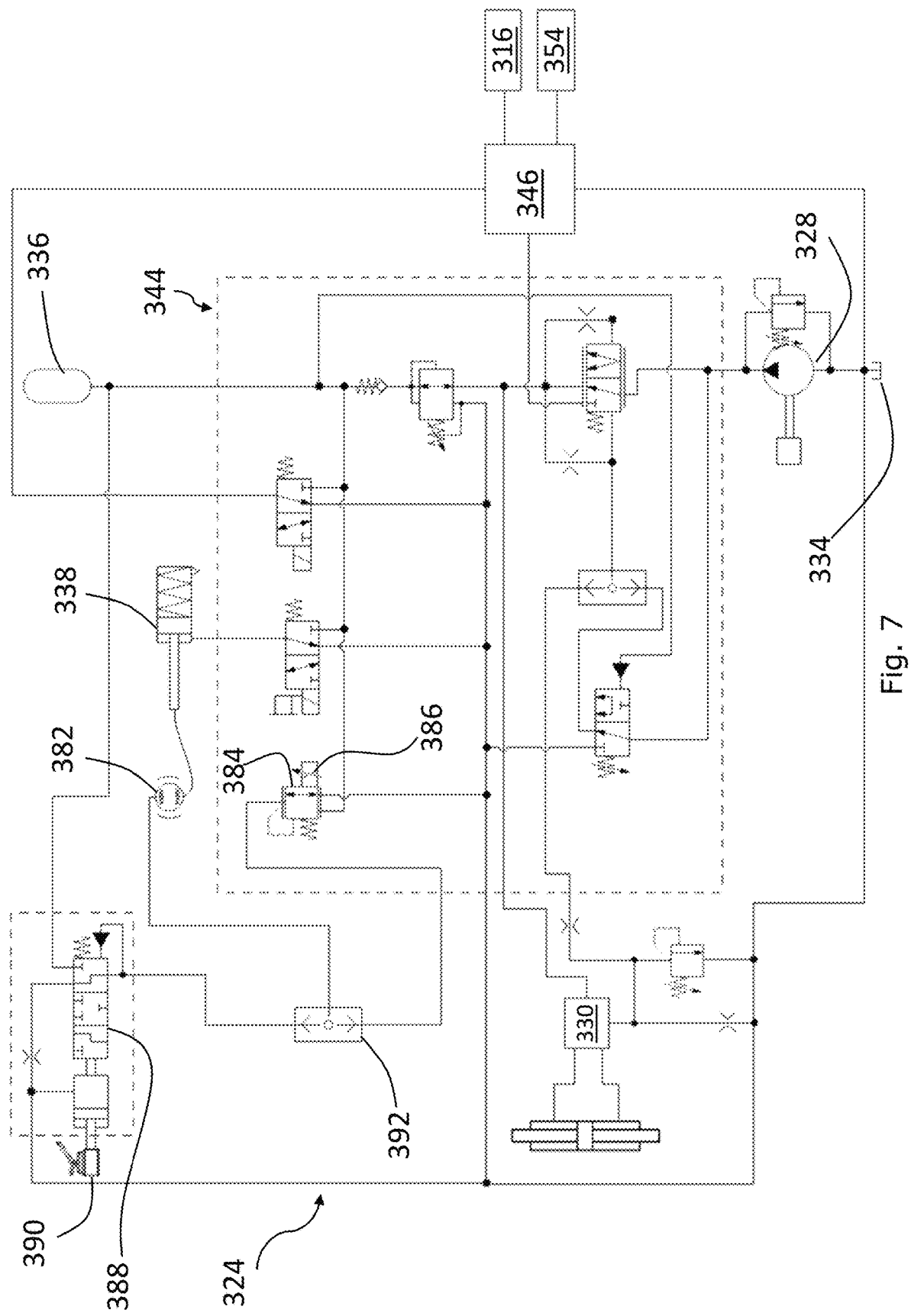
FIG. 7 shows a hydraulic system according to a further embodiment.

Referring now to FIG. 7, an alternative hydraulic system is indicated at 324. Corresponding components between the hydraulic systems of FIGS. 2 to 6 are labelled with the prefix "3", and only differences are discussed.

In the illustrated embodiment, the hydraulic system includes a supplementary brake 382 configured to supplement or replace a regenerative braking function of the working vehicle 10, at least temporarily. As will be described in more detail below, pressure in the hydraulic accumulator 336 is used to apply the supplementary brake 382.

Supplementing or replacing a regenerative braking function of the working vehicle 10 via actuation of the supplementary brake 382 is useful for operating conditions where regenerative braking is not available. For example, when a battery of the working vehicle 10 has recently been charged and the working vehicle 10 travels down a long incline, regenerative braking may lead to overcharge/damage of the battery. In this instance, regenerative braking would be turned off to avoid damage, which could lead to unwanted acceleration of the working vehicle 10 and/or excessive loading on manual brakes of the working vehicle 10. Turning off the regenerative braking may also result in the manual brakes being less responsive and feeling 'heavier'. Supplementing the regenerative braking with proportional actuation of the supplementary brake 382 therefore improves the safety and braking 'feel' of the working vehicle 10.

In the illustrated embodiment, the supplementary brake 382 and SAHR brake 338 refer to two separate circuits for applying the same mechanical brake to wheel discs of the working vehicle (as illustrated by the line linking supplementary brake 382 and SAHR brake 338 in FIG. 7). In other words, all of the supplementary brake valve 384, service brake valve 388, and SAHR brake valve 340 direct hydraulic fluid to control the state of the same mechanical brake. In alternative embodiments, the supplementary brake 382 is a different mechanical brake to the SAHR brake 338 (i.e. there may be two sets of brakes per wheel disc of the working vehicle, a first of the sets of brakes being actuated by the supplementary brake circuit 382 and a second of the sets of brakes being actuated by the SAHR brake circuit 338). In alternative embodiments, the service brake valve 388 directs hydraulic fluid to a different mechanical brake to the SAHR brake 338 and/or supplementary brake 382 (i.e. there may be two or three sets of brakes per wheel disc of the working vehicle, a first set of brakes being actuated by the service brake valve 388 and a second/third set of brakes being actuated by the SAHR brake valve 340/supplementary brake valve 384).

In the illustrated embodiment, a supplementary brake valve 384 is positioned between the hydraulic accumulator 336 and the supplementary brake 382. The supplementary brake valve 384 is actuated via a control system and is configured to control the state of the supplementary brake 382 via controlling a flow of hydraulic fluid from the hydraulic accumulator 336 to the supplementary brake 382.

Actuation via a control system ensures that when regenerative braking is turned off (i.e. via the control system) the supplementary brake valve 384 can be actuated to apply the supplementary brake 382, so that the working vehicle 10 does not accelerate undesirably.

In the illustrated embodiment, a supplementary brake valve solenoid 386 is provided to control the state of the supplementary brake valve 384. This provides a flexible variety of control options. In alternative embodiments, the supplementary brake valve 384 may be pilot-operated.

In exemplary embodiments, the control system is configured to actuate the supplementary brake valve 384 so that the supplementary brake 382 replaces a regenerative function of the working vehicle 10 when a state of charge of a battery of the working vehicle 10 is above a threshold value. Replacing the regenerative braking function of the working vehicle 10 when the state of charge of the battery is above a threshold value ensures that the battery does not overcharge (which can lead to degradation of the battery) whilst preventing the working vehicle 10 from accelerating undesirably.

In exemplary embodiments, the threshold value is 98% of maximum capacity of the battery. Such a threshold has been found to provide a good balance between maximising recharging performance and preserving battery capacity.

In some embodiments, the control system is configured to actuate the supplementary brake valve 384 so that the supplementary brake 382 is actuated simultaneously with a regenerative braking function of the working vehicle 10. For example, when the state of charge of the battery is within a range close to the threshold value (e.g. 90% to 98% of maximum capacity), the regenerative braking function may operate at less than maximum regenerative brake force, and the difference between the regenerative braking force applied and maximum regenerative braking force may be made up via actuation of the supplementary brake 382. In such embodiments, the proportion of braking forces provided by the supplementary brake may ramp up from a minimum proportion at a lower end of the range (e.g. at 90% state of charge), to a maximum proportion at the threshold value (e.g. at 98% state of charge).

In exemplary embodiments, the control system is configured to actuate the supplementary brake valve 384 to provide a proportional ramped pressure to the supplementary brake 382. In other words, the faster the working vehicle 10 is travelling, the greater the pressure of hydraulic fluid supplied to the supplementary brake 382 via the supplementary brake valve 384. This emulates a regenerative braking force, which is proportional to the speed of the working vehicle 10 (i.e. greater speed leads to greater regenerative braking force).

In some embodiments, the working vehicle 10 includes a user input for allowing the operator to set a desired regenerative braking force. For example, the user may select a light regenerative braking mode which simulates normal engine braking of a traditional diesel-powered working vehicle, a heavier regenerative braking mode which acts to bring the working vehicle to a complete stop when an accelerator pedal of the working vehicle is not depressed, or one or more intermediate modes between these light and heavier modes. In such embodiments, when the supplementary brake 382 is used to supplement or replace the regenerative braking force, the control system is configured so that actuation of the supplementary brake 382 is controlled to match the desired regenerative braking force set by the operator.

In the illustrated embodiment, a service brake valve 388 is positioned between the hydraulic accumulator 336 and the supplementary brake 382. The service brake valve 388 is actuated via a brake pedal 390 of the working machine 10 and is configured to control the state of the supplementary brake 382 via controlling a flow of hydraulic fluid from the hydraulic accumulator 336 to the supplementary brake 382. Such an arrangement allows an operator of the working machine 10 to selectively apply the supplementary brake 382 (e.g. when it is desired to decelerate the working vehicle 10 more quickly than can be done via regenerative braking alone). Furthermore, by controlling a flow of hydraulic fluid from the hydraulic accumulator 336 to the supplementary brake 382 (e.g. as opposed to mechanically actuating the supplementary brake) a greater braking force can be provided than would be provided by a foot of the operator.

In exemplary embodiments, the service brake valve 388 includes a spool which is mechanically connected to the brake pedal 390. Having a mechanical connection ensures that the service brake valve 388 can be actuated in the event of an electrical power failure.

In the illustrated embodiment, the supplementary brake valve 384 and the service brake valve 388 are each connected to the supplementary brake 382 via a shuttle valve 392. The supplementary brake valve 384 supplies a first flow of hydraulic fluid to the shuttle valve 392 at a first pressure and the service brake valve 388 supplies a second flow of hydraulic fluid to the shuttle valve 392 at a second pressure. The shuttle valve 392 is configured so that the supplementary brake 382 receives the first flow of hydraulic fluid when the first pressure is greater than the second pressure, and so that the supplementary brake 382 receives the second flow of hydraulic fluid when the second pressure is greater than the first pressure.

Having such a shuttle valve arrangement allows the maximum pressure to be applied to the supplementary brake 382 so that the working vehicle never "under-breaks" (i.e. either a force replicating the usual regenerative braking force is provided to the supplementary brake 382 via the supplementary brake valve 384, or if greater, a desired braking force provided by the operator via depression of the brake pedal 390 is provided to the supplementary brake 382 via the service brake valve 388).

In alternative embodiments, an alternative means of selecting higher pressure flow from the first or service brake valves 384, 388 is provided (e.g. a switching valve controlled via a control system, rather than a shuttle valve).

When the supplementary brake 382 is to be released (i.e. it is no longer desirable to decelerate the working vehicle 10 and/or the regenerative braking function of the working vehicle 10 is sufficient to decelerate the working vehicle 10 at a desired speed without need for actuation of the supplementary brake 382), hydraulic fluid pressure acting on the supplementary brake 382 is released to the hydraulic reservoir 334 via the supplementary brake valve 384 and/or service brake valve 388.

In the illustrated embodiment, the supplementary brake valve 384 is part of the first set of valves 344 and the service brake valve 388 is a separate valve. In alternative embodiments, the supplementary brake valve 384 is separate from the first set of valves 344. In alternative embodiments, the service brake valve 388 is part of the first set of valves 344. In alternative embodiments, the first and service brake valves 384, 388 are provided as a third set of valves separate from the first and second sets of valves 344, 346.

In some embodiments, a pressure transducer (not shown) is provided to detect pressure in the hydraulic line supplying the supplementary brake 382 (e.g. between shuttle valve 392 and supplementary brake 382). This gives an indication of the state of the supplementary brake 382 which can be used, for example, to alert the operator if the supplementary brake 382 has become stuck on.

In some embodiments, one or more pressure transducers (not shown) are provided to detect pressure in the hydraulic accumulator 336 and/or at other portions of the hydraulic system 324. In such embodiments, a warning may be provided to an operator if pressure in the hydraulic accumulator 336 and/or other portions of the hydraulic system drops below a threshold level (e.g. below 20 bar), for example, due to a hose burst or other leakage of hydraulic fluid. This gives an indication to the operator that the supplementary brake 382 may not function as normal and/or as desired (due to inadequate pressure). In such situations, the SAHR brake 338 may be applied as a precaution.

While no supplementary brake circuit is shown in the embodiments of FIGS. 2 to 6, it will be understood that a means of actuating a service/park brake would be provided (e.g. as a separate and independent hydraulic circuit to that shown).

Figure 8:
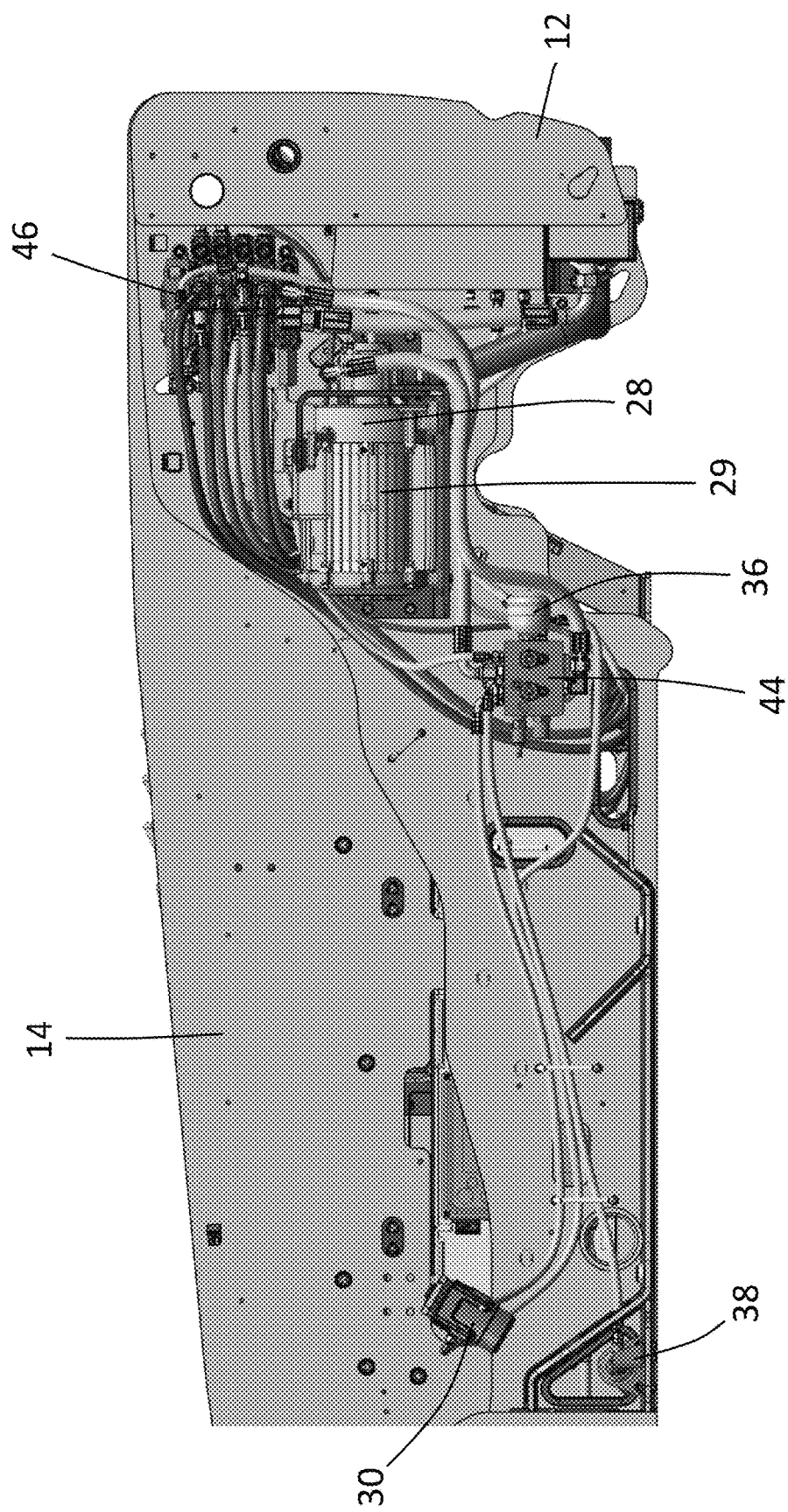
FIG. 8 shows the physical layout of the hydraulic system of FIG. 2.

Referring now to FIG. 8, a physical layout of the hydraulic system components of FIG. 2 on a portion of the body 12 of the working vehicle 10 is shown. As in FIGS. 3 to 7, the first set of valves 44 are provided in a single valve block. This provides the advantage of protecting the connections between the valves from damage in contrast to an arrangement with multiple valve blocks (e.g. where the hoses connecting individual valve blocks could be disconnected or form leaks). It also provides a compact arrangement which can be more easily packed around other components of the working vehicle 10. In addition, reducing the length of hose connections results in less pressure drop across the hydraulic circuit, which reduces the overall power required.

Although the teachings have been described in relation to one or more embodiments, it will be appreciated that various changes or modifications can be made without departing from the scope of the teachings as defined in the appended claims. For example:

the first set of valves 44, 144, 244, 344 may be provided as separate valves rather than a single valve block;

the working vehicle may be any other type of working vehicle, such as an excavator, backhoe loader or the like;

the first set of valves may have an alternative configuration to configurations 144, 244, 344 in FIGS. 3 to 7;

the working vehicle may be an electric powered vehicle, or a hybrid vehicle of the kind having an electric source of power and an alternative source of power;

the energy stored in the hydraulic accumulator 36, 136, 236, 336 may be used for alternative auxiliary functions of the working vehicle (e.g. functions other than the release of the SAHR brake, actuation of a supplementary brake and valve block isolation);

a number of different flow restrictors may be provided to control the pressure and flow of hydraulic fluid at different parts of the hydraulic system 24, 124, 224, 324;

any of the valves of the hydraulic system 24, 124, 224, 324 may be pilot-operated rather than solenoid operated;

the hydraulic pump 28, 128, 228, 328 may be coupled to a shaft of an ICE rather than an electric motor;

one or more filters may be provided to remove debris or particles present in the hydraulic system 23, 124, 224, 324; and a noise attenuator may be provided downstream of the hydraulic pump 28, 128, 228, 328 to reduce noise created from hydraulic ripples.

The invention claimed is:

1. A hydraulic system for an electric working vehicle or hybrid working vehicle of the kind having an electric source of power and an alternative source of power, the hydraulic system comprising:
   one or more hydraulically actuated devices for a working arm or power steering system of the working vehicle; and
   a hydraulic pump configured to supply hydraulic fluid to the one or more hydraulically actuated devices;
   a hydraulic accumulator;
   wherein the hydraulic pump is configured to operate in a low output state to maintain a low flow rate of hydraulic fluid so as to be instantaneously available to operate one of the one or more hydraulically actuated devices when a flow of hydraulic fluid is not required by any and all of the one or more hydraulically actuated devices;
   wherein the hydraulic pump is configured to operate in a higher output state when a flow of hydraulic fluid is required by the power steering system;
   wherein the hydraulic system is configured to use hydraulic fluid supplied by the hydraulic pump in the low output state to operate one or more auxiliary functions of the hydraulic system; and
   wherein the hydraulic system is configured to supply hydraulic fluid from the hydraulic pump in the low output state to the hydraulic accumulator.

2. A hydraulic system according to claim 1, wherein an output of the hydraulic pump in the higher output state is the lesser of: a flow rate of hydraulic fluid required by the power steering system, and a maximum output flow rate of the hydraulic pump.

3. A hydraulic system according to claim 1, further comprising a first set of valves comprising one or more directional control valves, wherein the first set of valves is configured to direct hydraulic fluid to the one or more hydraulically actuated devices and/or auxiliary functions of the hydraulic system.

4. A hydraulic system according to claim 3, wherein the hydraulic pump comprises a first port connected to a hydraulic reservoir and a second port connected to the first set of valves.

5. A hydraulic system according to claim 1, further comprising a spring applied hydraulically released (SAHR) brake, wherein pressure in the hydraulic accumulator is used to release the SAHR brake.

6. A hydraulic system according to claim 5, further comprising a SAHR brake valve positioned between the hydraulic accumulator and the SAHR brake, wherein the SAHR brake valve is configured to control the state of the SAHR brake via selectively permitting or blocking a flow of hydraulic fluid from the hydraulic accumulator to the SAHR brake.

7. A hydraulic system according to claim 6, wherein the SAHR brake valve is actuated via a hand brake, lever, switch or other user input of the working vehicle.

8. A hydraulic system according to claim 6, wherein the SAHR brake valve is actuated automatically via a control system.

9. A hydraulic system according to claim 6, wherein the SAHR brake valve is actuated via a manual override input of the working vehicle, wherein the manual override input is configured to control the state of the SAHR brake valve in the event of a power failure.

10. A hydraulic system according to claim 1, further comprising an electric motor configured to drive the hydraulic pump.

11. A hydraulic system according to claim 1, further comprising:
    a second set of valves comprising one or more directional control valves, wherein the second set of valves is configured to direct hydraulic fluid towards one or more of the hydraulically actuated devices; and
    a pilot line located between the hydraulic accumulator and the second set of valves,
    wherein the hydraulic system is configured to selectively alter the pressure in the pilot line in order to permit or inhibit movement of the second set of valves.

12. A hydraulic system according to claim 11, further comprising a pilot line isolation valve positioned between the hydraulic accumulator and the second set of valves, wherein the pilot line isolation valve is configured to permit or inhibit movement of the second set of valves via selectively permitting or blocking a flow of hydraulic fluid from the hydraulic accumulator to the second set of valves.

13. A hydraulic system according to claim 1, further comprising a supplementary brake configured to supplement or replace a regenerative braking function of the working vehicle, at least temporarily, wherein pressure in the hydraulic accumulator is used to apply the supplementary brake.

14. A hydraulic system according to claim 13, further comprising a supplementary brake valve positioned between the hydraulic accumulator and the supplementary brake, wherein the supplementary brake valve is actuated via a control system and is configured to control the state of the supplementary brake via controlling a flow of hydraulic fluid from the hydraulic accumulator to the supplementary brake.

15. A hydraulic system for an electric working vehicle or hybrid working vehicle of the kind having an electric source of power and an alternative source of power, the hydraulic system comprising:
- one or more hydraulically actuated devices for a working arm or a power steering system of the working vehicle; and
- a hydraulic pump configured to supply hydraulic fluid to the one or more hydraulically actuated devices;
- wherein the hydraulic pump is configured to operate in a low output state to maintain a low flow rate of hydraulic fluid so as to be instantaneously available to operate one of the one or more hydraulically actuated devices when a flow of hydraulic fluid is not required by any and all of the one or more hydraulically actuated devices; and
- wherein the hydraulic system is configured to use hydraulic fluid supplied by the hydraulic pump in the low output state to operate one or more auxiliary functions of the hydraulic system; and further including:
- a hydraulic accumulator, the hydraulic system configured to supply hydraulic fluid from the hydraulic pump in the low output state to the hydraulic accumulator;
- a supplementary brake configured to supplement or replace a regenerative braking function of the working vehicle, wherein pressure in the hydraulic accumulator is used to apply the supplementary brake;
- a supplementary brake valve positioned between the hydraulic accumulator and the supplementary brake, wherein the supplementary brake valve is actuated via a control system configured to control the state of the supplementary brake via controlling a flow of hydraulic fluid from the hydraulic accumulator to the supplementary brake; and
- a service brake valve positioned between the hydraulic accumulator and the supplementary brake, wherein the service brake valve is actuated via a brake pedal of the working machine and is configured to control the state of the supplementary brake via controlling a flow of hydraulic fluid from the hydraulic accumulator to the supplementary brake.

16. A hydraulic system according to claim 15, wherein the supplementary brake valve and the service brake valve are each connected to the supplementary brake via a shuttle valve, wherein the supplementary brake valve supplies a first flow of hydraulic fluid to the shuttle valve at a first pressure and the service brake valve supplies a second flow of hydraulic fluid to the shuttle valve at a second pressure, and wherein the shuttle valve is configured so that the supplementary brake receives the first flow of hydraulic fluid when the first pressure is greater than the second pressure, and so that the supplementary brake receives the second flow of hydraulic fluid when the second pressure is greater than the first pressure.

* * * * *